(12) United States Patent
Samanta et al.

(10) Patent No.: US 11,142,812 B2
(45) Date of Patent: Oct. 12, 2021

(54) MULTICALORIC MNNISI ALLOYS

(71) Applicants: Board of Supervisors of Louisiana State University and Agricultural and Mechanical College, Baton Rouge, LA (US); BOARD OF TRUSTEES OF SOUTHERN ILLINOIS UNIVERSITY, Carbondale, IL (US)

(72) Inventors: Tapas Samanta, Baton Rouge, LA (US); Shane Stadler, Baton Rouge, LA (US); Naushad Ali, Carbondale, IL (US)

(73) Assignees: Board of Supervisors of Louisiana State University and Agricultural and Mechanical College; BOARD OF TRUSTEES OF SOUTHERN ILLINOIS UNIVERSITY

( * ) Notice: Subject to any disclaimer, the term of this patent is extended or adjusted under 35 U.S.C. 154(b) by 724 days.

(21) Appl. No.: 14/801,836

(22) Filed: Jul. 17, 2015

(65) Prior Publication Data

US 2016/0017462 A1 Jan. 21, 2016

Related U.S. Application Data

(60) Provisional application No. 62/026,091, filed on Jul. 18, 2014.

(51) Int. Cl.
| | |
|---|---|
| *C22C 30/00* | (2006.01) |
| *H01F 1/01* | (2006.01) |
| *C22C 19/00* | (2006.01) |
| *C22C 22/00* | (2006.01) |

(52) U.S. Cl.
CPC ............ *C22C 30/00* (2013.01); *H01F 1/015* (2013.01); *C22C 19/005* (2013.01); *C22C 22/00* (2013.01)

(58) Field of Classification Search
CPC .......... C22C 22/00; C22C 30/00; H01F 1/015
USPC ........................................ 420/581
See application file for complete search history.

(56) References Cited

U.S. PATENT DOCUMENTS

| | | | |
|---|---|---|---|
| 5,641,424 A | 6/1997 | Ziolo et al. | |
| 6,826,915 B2 | 12/2004 | Wada et al. | |
| 7,114,340 B2 | 10/2006 | Pecharsky et al. | |

(Continued)

OTHER PUBLICATIONS

Zhang et al. "The tunable magnetostructural transition in MnNiSi—FeNiGe system." Appl. Phys. Lett. 103, 132411. Available online Sep. 26, 2013. (Year: 2013).*

(Continued)

*Primary Examiner* — Brian D Walck
(74) *Attorney, Agent, or Firm* — Thomas | Horstemeyer, LLP

(57) ABSTRACT

A multicaloric alloy material combines two isostructural compounds, the first compound being MnNiSi and the second compound being either MnFeGe or CoFeGe, each such compound having extremely different magnetic and thermo-structural properties. The resulting alloy material $(MnNiSi)_{1-x}(MnFeGe)_x$ or $(MnNiSi)_{1-x}(CoFeGe)_x$ possesses extraordinary magnetocaloric and/or barocaloric properties with an acute sensitivity to applied pressure and no appreciable magnetic hysteresis losses.

6 Claims, 19 Drawing Sheets

MULTICALORIC MnNiSi ALLOYS

(56) References Cited

U.S. PATENT DOCUMENTS

| | | | | |
|---|---|---|---|---|
| 8,211,326 B2* | 7/2012 | Bruck | ............... | H01F 1/015 |
| | | | | 252/62.51 R |
| 2008/0276623 A1 | 11/2008 | Ali et al. | | |

OTHER PUBLICATIONS

Wada, H. et al., Giant Magnetocaloric Effect of MnAs 1x Sb x, Applied Physics Letters, Sep. 7, 2001, pp. 3302-3304, vol. 79, No. 20, AIP Publishing, US.

Stadler, Shane, et al., Magnetocaloric Properties of Ni2Mn1—xCuxGa, OpenSIUC Publications, May 1, 2006, Paper 50, SIU, US, http://opensiuc.lib.siu.edu/phys_pubs/50.

Pecharsky, V. K., et al., Giant Magnetocaloric Effect in Gd5sSi2Ge2d, Physical Review Letters, Jun. 9, 1997, pp. 4494-4497, vol. 78, No. 23, The American Physical Society, US.

Khan, Mahmud; Stadler, Shane; and Ali, Naushad; "Intermartensitic Transformations in Ni2Mn1—xCoxGa Heusler Alloys"; published in Journal of Applied Physics, vol. 99 No. 8 (Apr. 2006) at doi: 10.1063/1.2176054.

Stadler, Shane; Khan, Mahmud; Mitchell, Joseph; Ali, Naushad; Gomes, Angelo M.; Dubenko, Igor; Takeuchi, Armando Y.; and Guimarães, Alberto P; "Magnetocaloric Properties of Ni2Mn1—xCuxGa"; published in Applied Physics Letters, vol. 88 No. 19 (May 2006) at doi: 10.1063/1.2202751.

Biswas, Anis et al, Designed materials with the giant magnetocaloric effect near room temperature. Acta Materialia, 2019, 341-348.

Stadler, Shane et al. Magnetocaloric properties of Ni2Mn1—xCuxGa, Applied Physics Letters 88, 192511 2006.

Guillou, F. et al. Microscopic mechanism of the giant magnetocaloric effect in MnCoGe alloys probed by x-ray magnetic circular dichroism. Applied Physics Letters 108, 122405 (2016).

Samanta, Tapas. Barocaloric and magnetocaloric effects in (MnNiSi)12x(FeCoGe)x. Applied Physics Letters 112, 021907 (2018).

Lloveras, Pol. APL Mater. 7, 061106 (2019) Giant reversible barocaloric response of (MnNiSi)1—x(FeCoGe)x (x=0.39,0.40,0.41).

Zhao JQ Magnetostructural transition and magnetocaloric effect in a MnCoSi-based material system, Journal of Alloys and Compounds 735 (2018) 959-963.

Deepak, K. Near room temperature giant magnetocaloric effect in (MnNiSi)1—x(Fe2Ge)x alloys. Journal of Alloys and Compounds 743 (2018) 494e505.

Samanta et al. Pressure-induced giant enhancement of magnetocaloric effects in MnNiSi-based systems, Magnetocalorics,Jul. 2014.

Samanta et al. Mn1-xFexCoGe: A strongly correlated metal in the proximity of a noncollinear ferromagnetic state; Jul. 2013; Applied Physics Letters 103(4).

Li et al Phase diagram, ferromagnetic martensitic transformation and magnetoresponsive properties of Fe-doped MnCoGe alloys. Journal of Magnetism and Magnetic Materials, (2013) 332, 146.

* cited by examiner

MULTICALORIC MnNiSi ALLOYS $$\begin{cases} 0.30 \leq x \leq 0.50 \\ \alpha, \beta, \gamma, \lambda, \mu, \nu \leq 0.25 \\ \delta \leq 15.0\% \text{ (by mass)} \\ Z = B, C, N, P, S, As, H \end{cases}$$

$$\begin{cases} 0.40 \leq x \leq 0.65 \\ \alpha, \beta, \gamma, \lambda, \mu, \nu \leq 0.25 \\ \delta \leq 15.0\% \text{ (by mass)} \\ Z = B, C, N, P, S, As, H \end{cases}$$

US 11,142,812 B2

MULTICALORIC MNNISI ALLOYS

RELATED APPLICATION

This application is a nonprovisional of and claims the benefit of priority of U.S. Provisional Application 62/026,091 filed 18 Jul. 2014, the entire contents of which are incorporated herein by this reference and made a part hereof.

GOVERNMENT RIGHTS

This invention was made with government support under grants DE-SC00010521, DE-FG02-13ER46946, and DE-FG02-06ER46291 awarded by US Department of Energy. The government has certain rights in the invention.

FIELD OF THE INVENTION

This invention relates generally to magnetocaloric materials, and, more particularly, to a multicaloric MnNiSi-based compounds that exhibits a magnetostructural transition temperature below 400 K, extraordinary magnetocaloric and barocaloric properties and an acute sensitivity to applied hydrostatic pressure.

BACKGROUND

Magnetic refrigeration techniques based on the magnetocaloric effect (MCE) are considered a preferred alternative to the more common, gas-compression-based refrigeration, and are expected to be employed in future solid-state based refrigeration devices for near room-temperature applications. A current challenge is to produce materials that exhibit improved giant MCEs, and to develop mechanisms that improve the MCE of the refrigerant materials in the context of applications. Giant MCE occurs when a large entropy change arises with a magnetic field-induced first order magnetostructural transition. Until now, only a few classes of materials, such as $Gd_5Si_2Ge_2$, MnAs-based materials, $La(Fe_{1-x}Si_x)_{13}$, MnCoGe-based compounds, $Ni_2MnGa$-based Heusler alloys, and $Ni_2MnIn$-based Heusler alloys, show giant MCEs close to room temperature. The effects are associated with a strong coupling of magnetic and structural degrees of freedom that result in a giant MCE in the vicinity of the magnetostructural transition (MST), accompanied by changes in crystal symmetry or volume. However, these materials have not been shown to exhibit appreciable sensitivity to an applied hydrostatic-pressure and/or electric field.

A requirement for application of a material for a particular application is the suitability of its transition temperature, which must occur at a temperature or temperature range suitable for an application, which in the case of refrigeration is 200 K to 400K. Another requirement is a sufficiently intense MCE, manifested as an adiabatic temperature change and/or isothermal entropy change. It is also advantageous for the material to have a large MCE over a wide temperature range suitable for the application. As hysteresis results in an energy loss and, therefore, an increase in the input work of the thermodynamic cycle as the result of entropy generation, which can drastically reduce the MCE during a cycling operation as well as the efficiency of the magnetocaloric device, the material should exhibit as small a magnetic and thermal hysteresis as possible.

Pressure is a controllable external parameter that can affect the structural entropy change ($\Delta S_{st}$) of a system, where $\Delta S_{st}$ is related to the total entropy change ($\Delta S_{tot}$) and the magnetic entropy change ($\Delta S_M$) through $\Delta S_{tot}=\Delta S_M+\Delta S_{st}$. However, a pressure-induced enhancement of the MCE has rarely been observed. Furthermore, a pressure-induced enhancement of the MCE at temperatures suitable for refrigeration has not, heretofore, been observed.

In sum, new giant MCE materials that exhibit a magnetostructural transition temperature below 400 K, extraordinary magnetocaloric and barocaloric properties, low hysteresis, and an acute sensitivity to applied hydrostatic pressure are needed.

The invention is directed to overcoming one or more of the problems and solving one or more of the needs as set forth above.

SUMMARY OF THE INVENTION

To solve one or more of the problems set forth above, a multicaloric system according to principles of the invention exhibits a coupled magnetic and structural transition temperature at less than 400 K, extraordinary magnetocaloric and/or barocaloric properties and an acute sensitivity to applied hydrostatic pressure. The isostructural alloying of two compounds with extremely different magnetic and thermo-structural properties, in accordance with principles of the invention, results in a MnNiSi system, either $(MnNiSi)_{1-x}(CoFeGe)_x$ or $(MnNiSi)_{1-x}(MnFeGe)_x$, that exhibits extraordinary magnetocaloric and/or barocaloric properties with an acute sensitivity to applied hydrostatic pressure (P). Application of hydrostatic pressure shifts the first-order phase transition to lower temperature while preserving a giant value of isothermal entropy change. Hydrostatic pressure shifts the temperature of the phase transition responsible for the MCE, providing a means to tune the MCE over a broad temperature range, while preserving a large value of $-\Delta S^{max}$. Together with the magnetic field, this pressure-induced temperature shift significantly increases the effective relative cooling power.

An exemplary alloy for a multicaloric system according to principles of the invention combines a first isostructural compound comprising Mn, Ni and Si with a second isostructural compound comprising Fe, Ge and either Mn or Co. The second isostructural compound has a stable hexagonal $Ni_2In$-type structure and a Curie Temperature less than 400K, while the first isostructural compound exhibits a structural transition at an extremely high temperature of about 1200 K and Tc~662 K. The proportion of the first isostructural compound and the second isostructural compound be given by the formula $A_{1-x}B_x$, where A is the first isostructural compound, B is the second isostructural compound, and x is between 0.30 and 0.65, with x being 0.40 to 0.65 if the second isostructural compound is Fe, Ge and Mn, and x being 0.30 to 0.50 if the second isostructural compound is Fe, Ge and Co.

Atomic percentages of Mn, Ni and Si in the first isostructural compound may be about equal, with the first isostructural compound comprising $Mn_{1\pm\alpha}Ni_{1\pm\beta}Si_{1\pm\gamma}$, wherein $\alpha \le 0.25$, $\beta \le 0.25$, and $\gamma \le 0.25$. Likewise the atomic percentages of Fe, Ge and Mn or Fe, Ge and Co in the second isostructural compound may be about equal, with the second isostructural compound comprising $Fe_{1\pm\lambda}Mn_{1\pm\mu}Ge_{1\pm\nu}$, wherein $\lambda \le 0.25$, $\mu \le 0.25$, and $\nu \le 0.25$ or the second isostructural compound comprising $Co_{1\pm\lambda}Fe_{1\pm\mu}Ge_{1\pm\nu}$, wherein $\lambda \le 0.25$, $\mu \le 0.25$, and $\nu \le 0.25$.

The alloy may further include an element from the group consisting of B, C, N, P, S, As and H, with the element constituting not more than 15% by mass of the alloy.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the Figures are not intended to be drawn to any particular scale; nor are the Figures intended to illustrate every embodiment of the invention. The invention is not limited to the exemplary embodiments depicted in the Figures or the specific components, configurations, shapes, relative sizes, ornamental aspects or proportions as shown in the Figures.

DETAILED DESCRIPTION

Two new MnNiSi multicaloric compositions are provided. They include $(Mn_{1\pm\alpha}Ni_{1\pm\beta}Si_{1\pm\gamma})_{1-x}(Co_{1\pm\lambda}Fe_{1\pm\mu}Ge_{1\pm\nu})_x+\delta Z$ and $(Mn_{1\pm\alpha}Ni_{1\pm\beta}Si_{1\pm\gamma})_{1-x}(Fe_{1\pm\lambda}Mn_{1\pm\mu}Ge_{1\pm\nu})_x+\delta Z$, over the range of variables specified in FIG. 1, each with an optional additional element (Z). The subscript variables, α, β, γ, λ, μ, ν may be zero or another amount less than or equal to 0.25. The additional element (Z), which may comprise B, C, N, P, S, As, H, is optional. When present, Z may comprise up to 15% (by mass) of the formulation. The variable x may be from 0.30 to 0.50 in the formulation containing Co, and from 0.40 to 0.65 in the other formulation. Each formulation is based upon MnNiSi. Typically, the elemental subscripts are 1 or about 1, meaning that the subscript variables α, β, γ, λ, μ, ν are 0 or about 0.

The MnNiSi system, which exhibits a structural transition at an extremely high temperature of about 1200 K (approximately 900 K higher than room temperature), and $T_c \sim 662$ K, is quite different than other MCE compounds. Reducing the structural transition at $T_M$ drastically, in order to locate the MST near room temperature, was a challenging task, for which a single-element substitution was not sufficient. Alloying with a compound having a stable hexagonal Ni$_2$In-type structure and a Curie Temperature less than 400K reduced the structural transition at T$_M$ drastically, in order to locate the MST near room temperature. Specifically, it was found that isostructurally alloying MnNiSi with either MnFeGe (which has a stable hexagonal Ni$_2$In-type structure and Tc~159 K) or with CoFeGe (which also has a stable hexagonal Ni$_2$In-type structure and Tc~370 K) stabilizes the hexagonal Ni$_2$In-type phase by sharply reducing the structural transition temperature from 1200 K to less than 400 K. As a result, coupled magnetostructural transitions have been realized in (MnNiSi)$_{1-x}$(MnFeGe) and (MnNiSi)$_{1-x}$(CoFeGe)$_x$, near room temperature.

Figure 1:
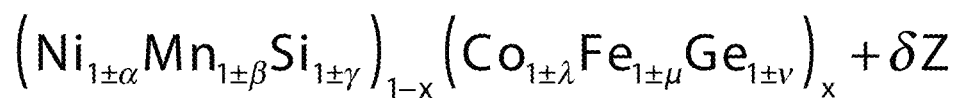
FIG. 1 conceptually illustrates exemplary compositions for MnNiSi-based alloys that exhibit magnetostructural transition temperatures at less than 400 K, extraordinary magnetocaloric properties and an acute sensitivity to applied hydrostatic pressure, in accordance with principles of the invention.
Figure 1:
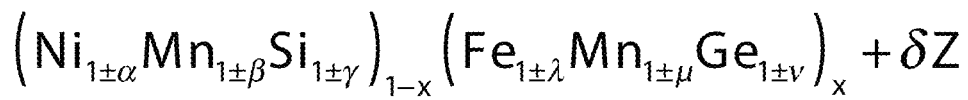

Thus, an alloy composition according to principles of the invention comprises two isostructural compounds, compounds A and B, each of which exhibits magnetic and isostructural properties that are extremely different from those exhibited by the other. Isostructural compound A comprises elements Mn, Ni and Si, in about equal atomic percents. Isostructural compound B comprises Fe, Ge and either Mn or Co, in about equal atomic percents. The concentrations of the isostructural compounds are given by A$_{1-x}$B$_x$, where the variable x in the subscript is from 0.30 to 0.50 in the formulation wherein B contains Co, and from 0.40 to 0.65 in the other formulation. The atomic percentages of the elements in an isostructural compound may vary by up to about 25 percent, as indicated in FIG. 1. Additionally, an optional additional element Z may be included, where Z may comprise about up to 15% by mass of the alloy composition and consist of one of the following elements: B, C, N, P, S, As, and H.

Various samples were synthesized, including polycrystalline samples of (MnNiSi)$_{1-x}$(CoFeGe)$_x$ (x=0.37, 0.38, 0.39, and 0.40) and (MnNiSi)$_{1-x}$(MnFeGe)$_x$ (x=0.52 and 0.54). The samples were prepared by arc-melting constituent elements of purity better than 99.9% in an ultra-high purity argon atmosphere. The arc-melted product was then annealed under high vacuum for 3 days at an elevated temperature, such as 750° C. The annealed product was then quenched in cold water. The invention is not limited to any particular starting materials or method of synthesis. Similar results may be attained with lower or higher quality constituents, without arc-melting, annealing or quenching, and using other alloy synthesis methods, such as RF melting.

Synthesized samples were subjected to inspection and testing. Crystal structures of the samples were determined using a room temperature X-ray diffractometer (XRD) employing Cu Kα$_1$ radiation. Temperature-dependent XRD measurements were conducted on a Bruker D8 Advance diffractometer using a Cu Kα$_1$ radiation source (λ=1.54060 Å) equipped with a LYNXEYE XE detector. A superconducting quantum interference device magnetometer (SQUID, Quantum Design MPMS) was used to measure magnetization of samples within the temperature interval of 10-400 K, and in applied magnetic fields (B) up to 5 T. Magnetic measurements under hydrostatic pressure were performed in a commercial BeCu cylindrical pressure cell (Quantum Design, Inc.). Daphne 7373 oil was used as the pressure transmitting medium. The value of the applied pressure was calibrated by measuring the shift of the superconducting transition temperature of Sn or Pb used as a reference manometer (Sn has a critical temperature (Tc) ~3.72 K at ambient pressure, and Pb has a critical temperature (Tc)~7.19 K at ambient pressure). Heat capacity measurements were performed using a physical properties measurement system (PPMS by Quantum Design, Inc.) in a temperature range of 220-270 K and in fields up to 5 T. From isothermal magnetization [M(B)] curves, −ΔS was estimated using the integrated Maxwell relation:

$$-\Delta S = \int_0^B \left(\frac{\partial M}{\partial T}\right)_B dB \quad \text{Maxwell Reaction}$$

The Clausius-Clapeyron equation was also employed to calculate the values of −ΔS$_{max}$ from thermomagnetization curves [M(T)] measured at different constant magnetic fields.

$$\frac{\Delta S}{\Delta M} = \frac{dB}{dT} \quad \text{Clausius-Clapeyron Equation}$$

Figure 2:
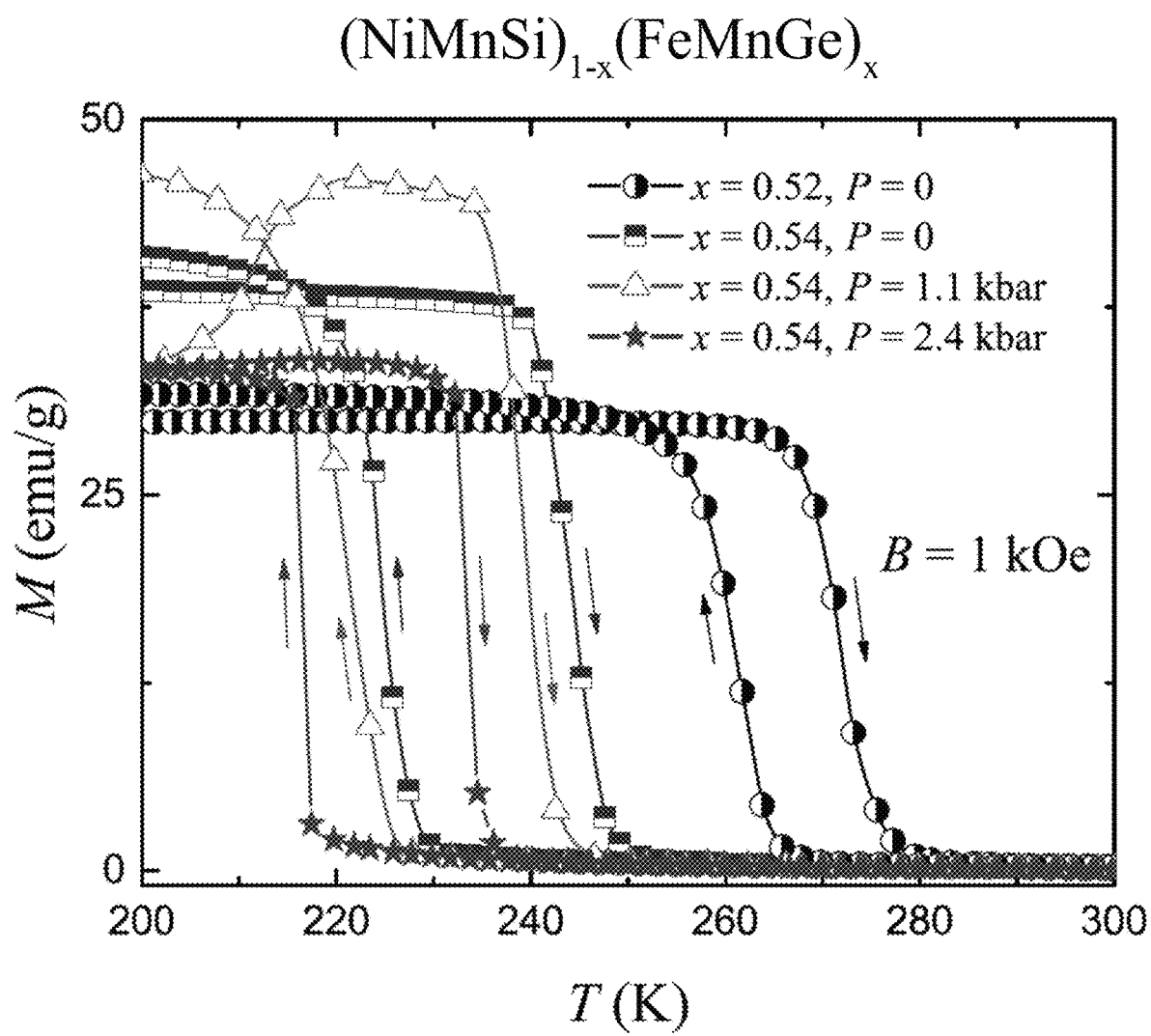
FIG. 2 conceptually illustrates temperature dependence of magnetization in the presence of a 1 kOe magnetic field during heating and cooling (direction indicated by arrows) for $(MnNiSi)_{1-x}(FeMnGe)$ as measured at ambient pressure and at different applied hydrostatic pressures.

FIG. 2 conceptually illustrates temperature dependence of magnetization in the presence of a 1 kOe magnetic field during heating and cooling (direction indicated by arrows) for (MnNiSi)$_{1-x}$(FeMnGe)$_x$ as measured at ambient pressure and at different applied hydrostatic pressures. A sharp change in magnetization was observed in the vicinity of the phase transition, representing a magnetic transition from a low-temperature ferromagnetic (FM) state to a high-temperature paramagnetic (PM). The observed thermal hysteresis between heating and cooling curves indicates that the magnetic and structural transitions coincide, leading to a single first-order MST (at T$_M$) from a FM to PM state facilitated by the drastic decrease (by greater than 900 K) of the structural transition temperature. Increasing the level of substitution of hexagonal MnFeGe shifts T$_M$ to lower temperature while maintaining the coupled nature of the MST. It should be noted that this coupling is substantial only in a very narrow range of concentrations (0.50<x<0.56).

Figure 3:
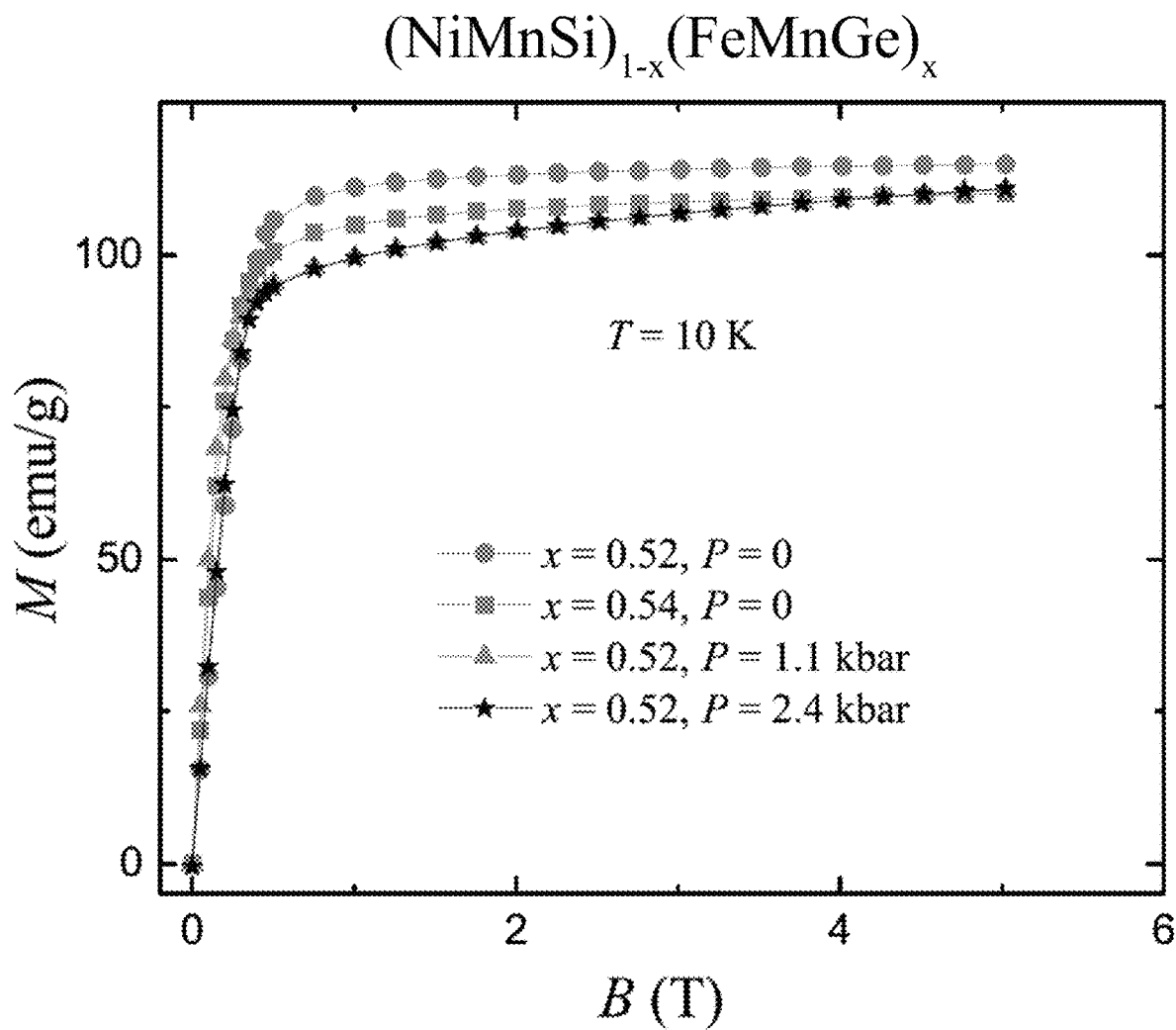
FIG. 3 provides isothermal magnetization curves for $(MnNiSi)_{1-x}(FeMnGe)$ at T=10 K at ambient pressure and at different applied hydrostatic pressures.

FIG. 3 provides isothermal magnetization curves at 10 K for (MnNiSi)$_{1-x}$(FeMnGe)$_x$, at ambient pressure and at different applied hydrostatic pressures. The application of hydrostatic pressure (P) stabilizes the hexagonal phase at lower temperature, at a rate of decrease dT$_M$/dP=−4.5 K/kbar for the sample with x=0.54. This shift is possibly associated with a distortion of the orthorhombic lattice that increases the stability of the hexagonal phase. The low temperature M(H) curves as measured at 10 K show a shape typical for FM-type ordering. The value of the magnetization for 5 T (M$_{5T}$) slightly decreases with increasing x. However, the pressure-induced change of M$_{5T}$ is almost negligible, suggesting a minor variation of the ferromagnetic exchange in the low-temperature orthorhombic phase that may be attributed to a slight modification of the electronic density of states at the Fermi level.

Figure 4:
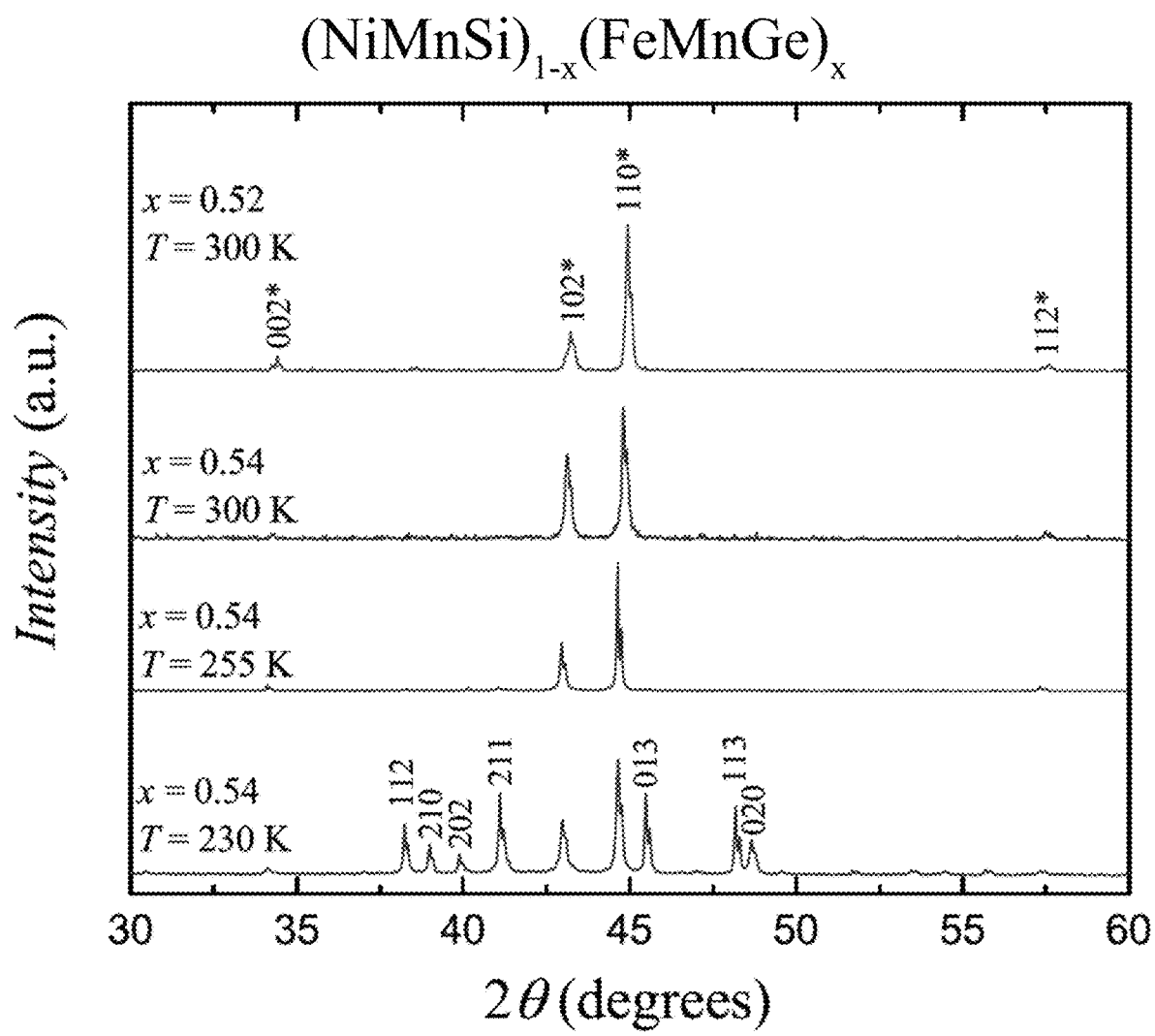
FIG. 4 provides X-ray diffraction patterns for $(MnNiSi)_{1-x}(FeMnGe)$, measured at temperatures immediately before and after the magnetostructural transition, with Miller indices of the high-temperature hexagonal and low-temperature orthorhombic phases are designated with and without an asterisk (*), respectively.
Figure 5:
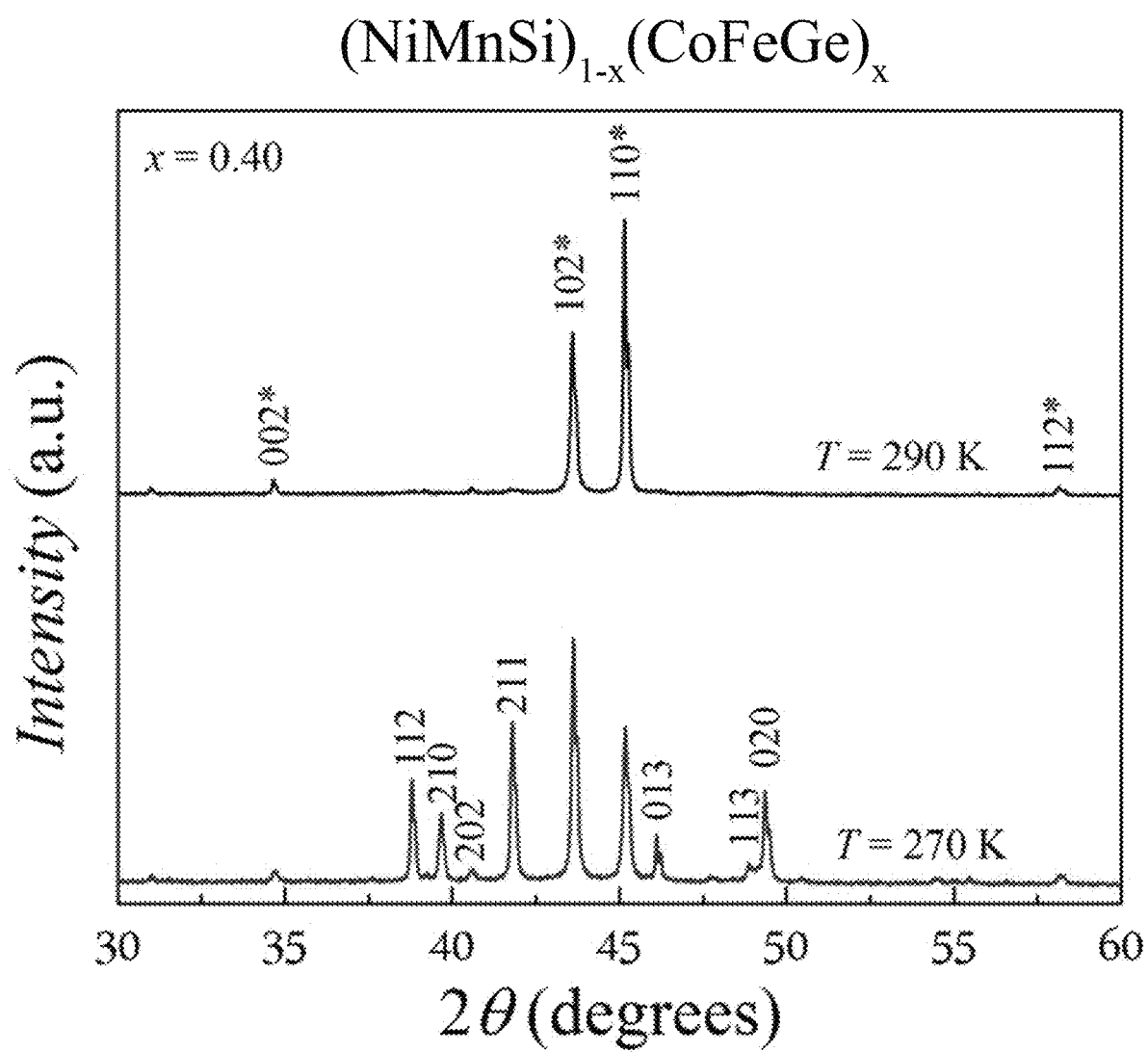
FIG. 5 provides X-ray diffraction patterns for $(MnNiSi)_{1-x}(CoFeGe)_x$, measured at temperatures immediately before and after the magnetostructural transition, with Miller indices of the high-temperature hexagonal and low-temperature orthorhombic phases are designated with and without an asterisk (*), respectively.

With reference to FIG. 4, X-ray diffraction patterns for (MnNiSi)$_{1-x}$(FeMnGe)$_x$, measured at temperatures immediately before and after the magnetostructural transition, with Miller indices of the high-temperature hexagonal and low-temperature orthorhombic phases designated with and without an asterisk (*), respectively, are provided. Similarly, FIG. 5 provides X-ray diffraction patterns for (MnNiSi)$_{1-x}$(CoFeGe)$_x$, measured at temperatures immediately before and after the magnetostructural transition. The maximum field-induced entropy change (−ΔS) has been estimated using both the Maxwell relation as well as the Clausius-Clapeyron equation. The thermal variations of −ΔS, as estimated using the Maxwell relation for the magnetic field change ΔH=1-5 T, are plotted in FIG. 9 for the compositions with x=0.52 and 0.54, and were calculated using the isothermal magnetization curves measured at different constant temperatures. A large value of −ΔS detected at ambient pressure is associated with the first-order magnetostructural transition. Considering the higher degree of applicability (and reliability) of the Clausius-Clapeyron equation in the vicinity of discontinuous, first-order magnetostructural transitions, the maximum value of −ΔS also has been estimated using Clausius-Clapeyron equation, yielding a value of 44 J/kg K for ΔH=5 T. The values of −ΔS are in good agreement as estimated using the two different equations, which lends justification to the use of the Maxwell relation with the invention. Notably, the application of relatively low hydrostatic pressure (~2.4 kbar) leads to a giant enhancement of −ΔS, from +44 J/kg K (ambient pressure) to +89 J/kg K (P=2.4 kbar), for a field change of 5 T (for x=0.54). Also noteworthy is the shift of the $T_M$ to lower temperature by 4.5 K/kbar with applied pressure. Moreover, the field dependent hysteresis loss is negligible.

Figure 13:
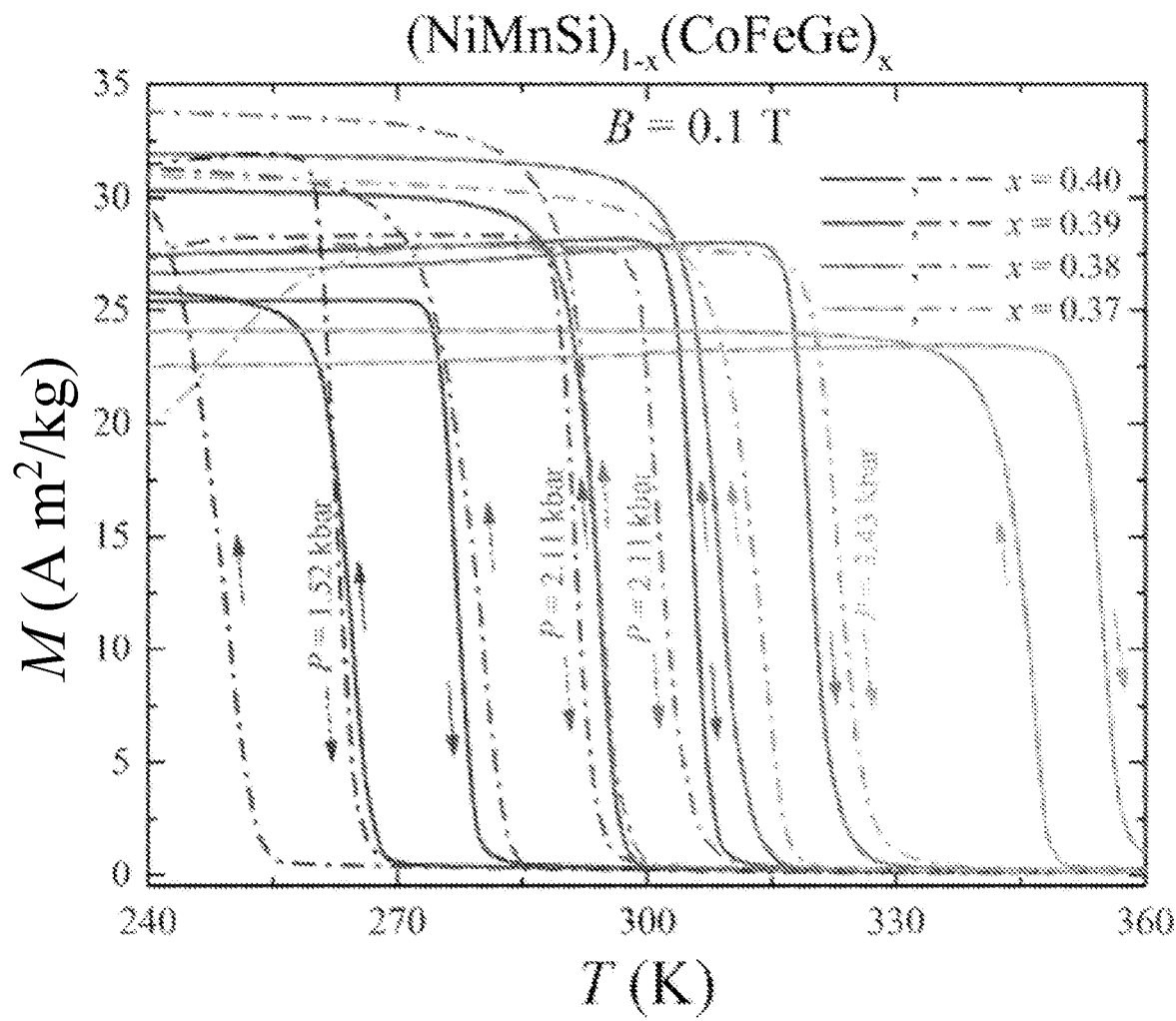
FIG. 13 illustrates composition dependent temperature dependency of magnetization in the presence of a 0.1 T magnetic field during heating and cooling for $(MnNiSi)_{1-x}(CoFeGe)_x$, as measured at various pressures and concentrations (x)

With reference to FIG. 13, the application of hydrostatic pressure (P) has an effect that resembles that of increasing the concentration (x) of FeCoGe, shifting the magnetostructural transition temperature ($T_M$) to lower temperature by about 10 K per kbar of applied pressure ($dT_M/dP$~−10 K/kbar). Reducing the lattice parameter $a_{ortho}$ in the orthorhombic crystal structure distorts the geometry of MnNiSi, resulting in a stabilization of the hexagonal phase. Therefore, the shift in $T_M$ with application of pressure is likely associated with a pressure-induced distortion of the orthorhombic lattice that increases the stability of the hexagonal phase. From the pressure-induced shift in $T_M$, and the volume change through the MST as determined from temperature-dependent X-ray diffraction (XRD), the equivalent average compressibility per unit substitution of FeCoGe is estimated to be approximately $7.93 \times 10^{-11}$ $Pa^{-1}$.

Figure 6:
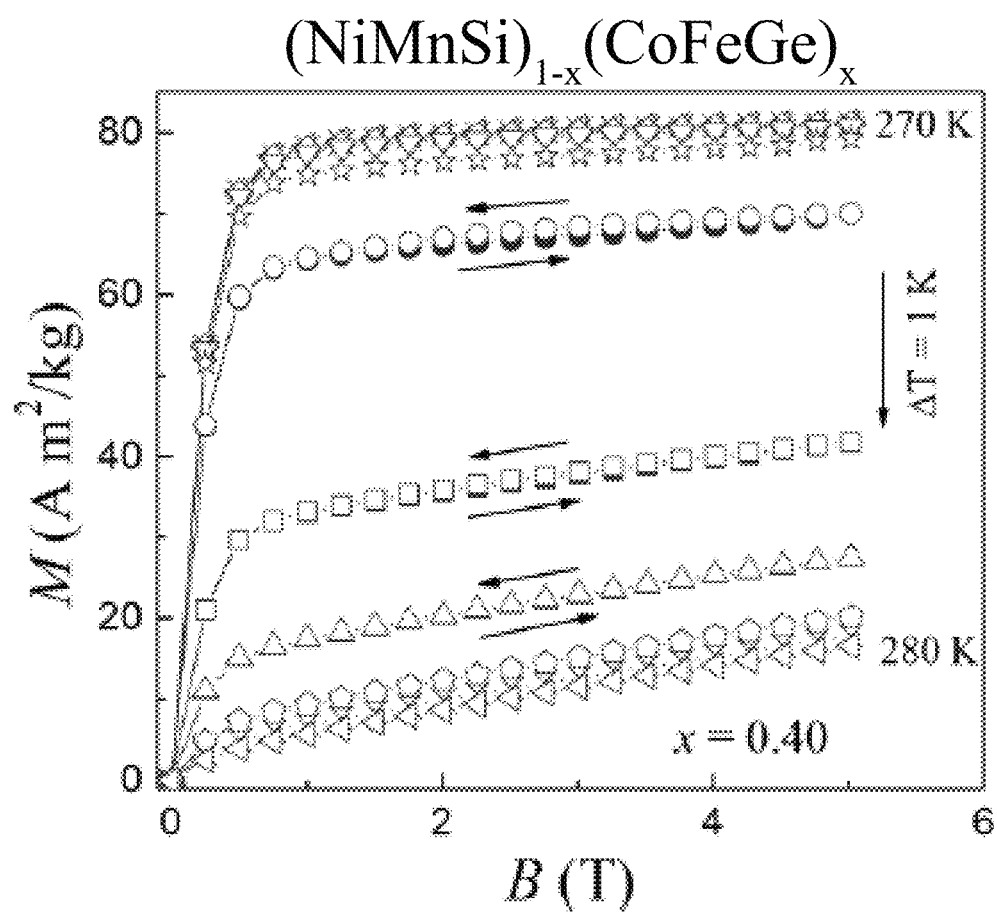
FIG. 6 provides isothermal magnetization curves for $(MnNiSi)_{1-x}(CoFeGe)_x$ in the vicinity of the MST, with x=0.40, showing negligible magnetic hysteresis loss (i.e., the magnetization curves are reversible in field)
Figure 7:
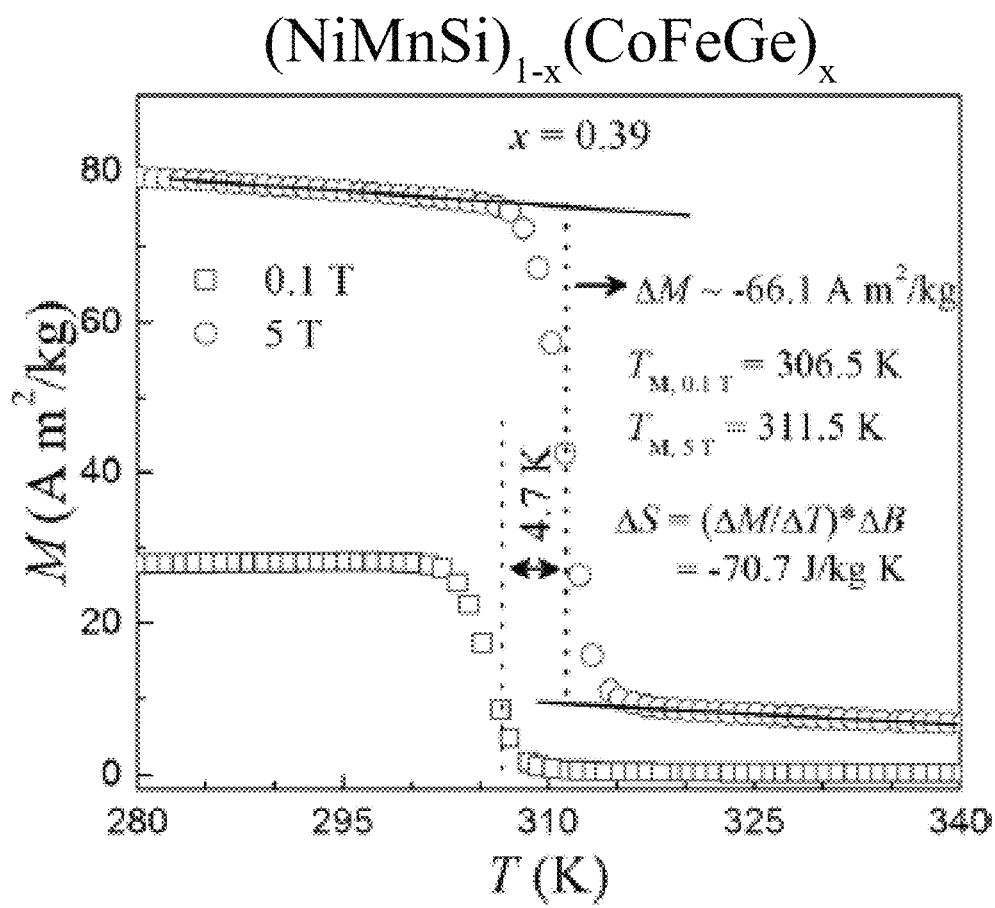
FIG. 7 provides heating thermomagnetization curves for applied fields B=0.1 and 5 T used to estimate the value of $-\Delta S$ for $(MnNiSi)_{1-x}(CoFeGe)_x$, with x=0.39, using the Clausius-Clapeyron equation.

With reference to FIGS. 6 and 7, a large field-induced isothermal entropy change occurs near magnetostructural transition for MnNiSi alloys according to principles of the invention. FIG. 6 provides isothermal magnetization curves for $(MnNiSi)_{1-x}(CoFeGe)_x$, with x=0.40, showing negligible magnetic hysteresis loss (i.e., the magnetization curves are reversible in field) in the vicinity of magnetostructural transition. From isothermal magnetization [M(B)] curves, entropy change −ΔS was estimated using the integrated Maxwell relation. FIG. 7 provides heating thermomagnetization curves for $(MnNiSi)_{1-x}(CoFeGe)_x$ for applied fields B=0.1 and 5 T used to estimate the value of −ΔS for x=0.39 using the Clausius-Clapeyron equation. A large, field-induced isothermal entropy change (−ΔS) occurs in the vicinity of the MST. Specifically, the x=0.40 compound has a $-\Delta S^{max}$=143.7 J/kg K for a field change of ΔB=5 T, which is about 63% of theoretical limit $-\Delta S^{max}_{th}$=n·R·ln(2J+1)=228.4 J/kg K, where J is the total angular momentum of the magnetic ions, R is the universal gas constant, and n is the number of magnetic atoms per formula unit. The observed value of −ΔSmax is believed to be the largest reported to date for any magnetocaloric or barocaloric material.

Figure 8:
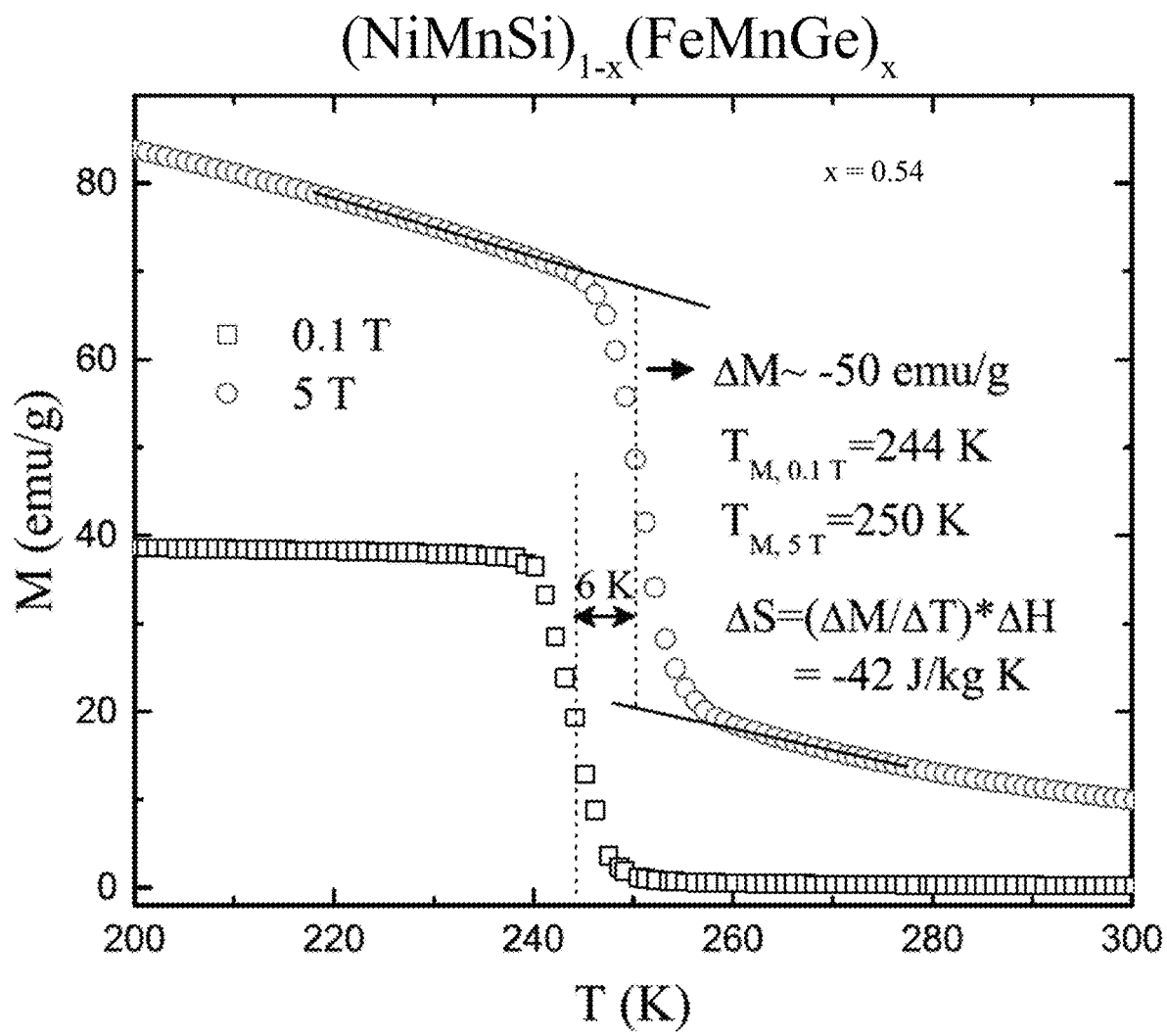
FIG. 8 heating thermomagnetization curves for applied fields B=0.1 and 5 T used to estimate the value of $-\Delta S$ for $(MnNiSi)_{1-x}(FeMnGe)_x$, with x=0.54, using the Clausius-Clapeyron equation.
Figure 9:
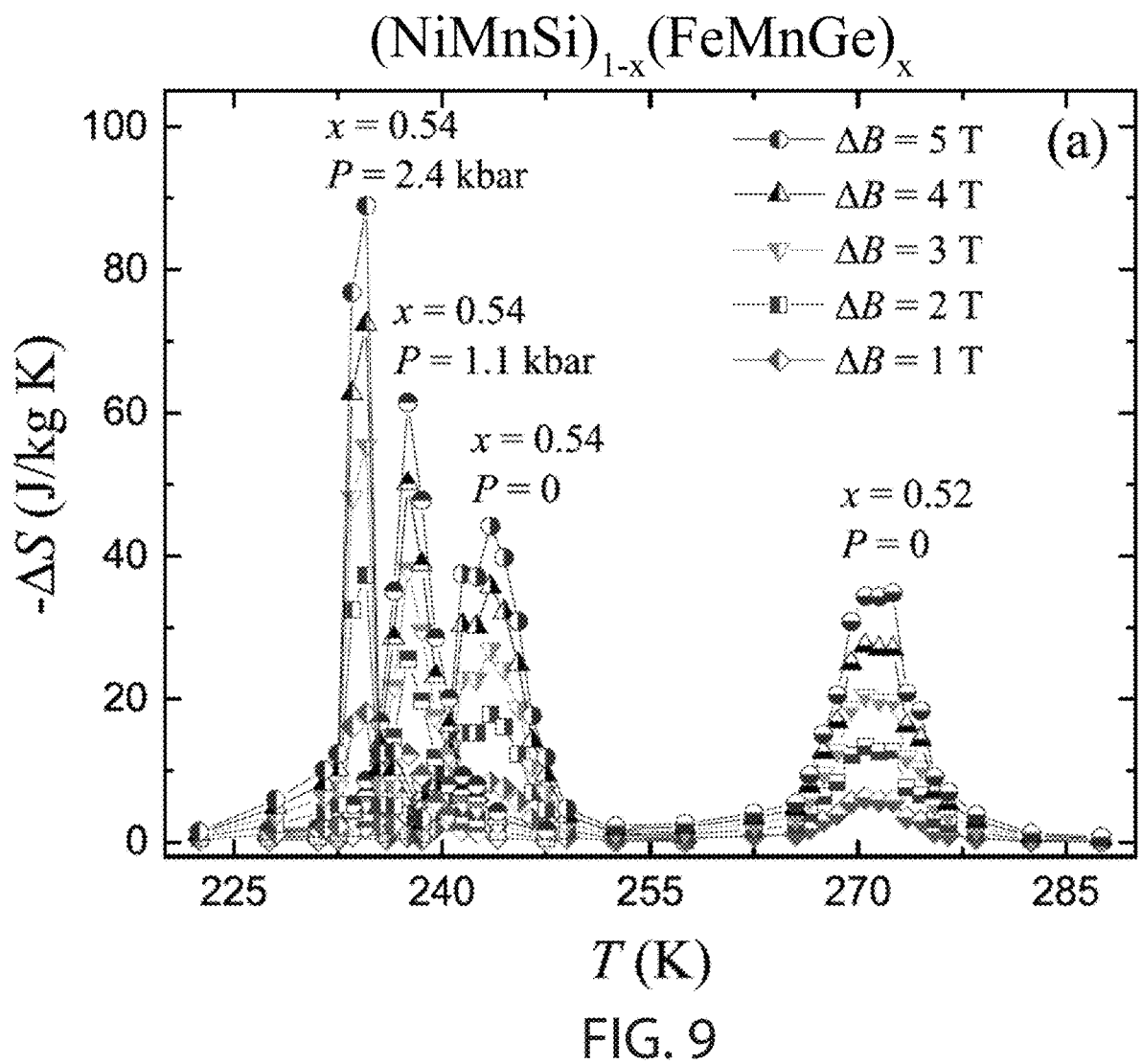
FIG. 9 provides plots of the isothermal entropy change $(-\Delta S)$ as a function of temperature and pressure, for $(MnNiSi)_{1-x}(FeMnGe)_x$, estimated using a Maxwell relation for magnetic field changes of $\Delta B=5$ T to 1 T by 1 T increments.

With reference to FIGS. 8 and 9, the maximum field-induced entropy change (−ΔS) for $(MnNiSi)_{1-x}(FeMnGe)_x$ was determined using both the Maxwell relation and Clausius-Clapeyron equation. FIG. 8 conceptually illustrates temperature dependence of magnetization and entropy change for applied fields B=0.1 and 5 T for $(MnNiSi)_{1-x}(FeMnGe)_x$ at ambient pressure. FIG. 9 provides plots of the isothermal entropy change (−ΔS) for $(MnNiSi)_{1-x}(FeMnGe)_x$ as a function of temperature, estimated using a Maxwell relation for magnetic field changes of ΔB=5 T to 1 T by 1 T increments. As plotted in FIG. 9, a large value of ΔS has been observed at ambient pressure and is associated with the first-order MST. Considering the higher degree of applicability (and reliability) of the Clausius-Clapeyron equation in the vicinity of discontinuous, first-order MSTs, the maximum value of −ΔS also has been estimated from thermomagnetization curves measured at different constant fields (B=0.1 and 5 T, respectively) using the Clausius-Clapeyron equation, yielding a value of 42 J/kgK for B=5 T (where M~−50 emu/g and T~6 K). The values of −ΔS are in good agreement as estimated using the two methods. Notably, the application of relatively low hydrostatic pressure (~2.4 kbar) leads to a significant enhancement of −ΔS, from ~44 J/kgK (ambient pressure) to 89 J/kgK (P=2.4 kbar), for a field change of 5 T (for x=0.54). Also noteworthy, $T_m$ shifts to lower temperature by 4.5 K/kbar with applied pressure, suggesting a destabilization of the low-temperature phase, revealing a method in which the transition can be tuned in temperature. Moreover, the field-dependent hysteresis loss is negligible in this system.

Figure 10:
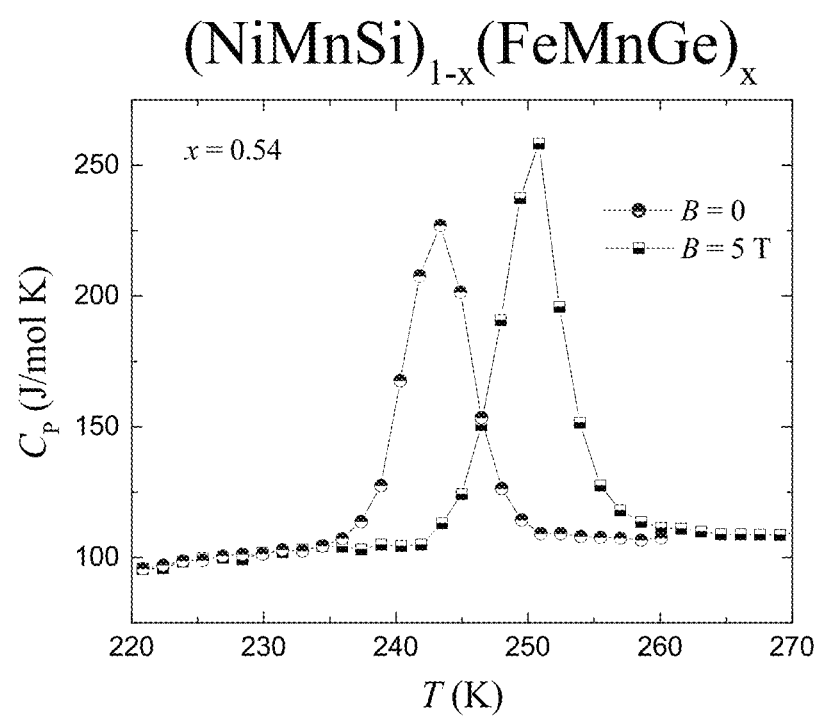
FIG. 10 conceptually illustrates heat capacity $(C_P)$ as a function of temperature for $(MnNiSi)_{1-x}(FeMnGe)_x$ (x=0.54) at different constant magnetic fields.

To estimate the value of −ΔS as well as the adiabatic temperature change ($\Delta T_{ad}$) at ambient pressure, temperature dependent heat capacity measurements at various constant magnetic fields were performed. FIG. 10 conceptually illustrates heat capacity ($C_P$) as a function of temperature for $(MnNiSi)_{1-x}(FeMnGe)_x$ (x=0.54) at different constant magnetic fields. The heat capacity measurements are in qualitative agreement with the magnetization data in terms of the phase transition, but likely underestimate the values of −ΔS and ΔTad. Estimations of −ΔS and ΔTad are quantitatively unreliable due to a decoupling of the sample from the heat capacity measurement platform as a result of drastic structural changes at MST and an attendant structural breakdown of the tested bulk polycrystalline sample.

This observed degree of enhancement of −ΔS is rare. For the tested sample of $(MnNiSi)_{1-x}(FeMnGe)_x$ (x=0.54), the maximum magnitude of −ΔS reaches a value of 89 J/kgK with the application of 2.4 kbar for Δβ=5 T, which greatly exceeds that observed in other well-known giant magnetocaloric materials. In this case, the combined effect of pressure and magnetic field could facilitate an improvement in the magnetocaloric working efficiency of the material. As the hydrostatic pressure increases, $T_M$ decreases, and the maximum value of −ΔS increases in a nearly linear fashion up to 2.4 kbar. A careful examination of pressure-induced −ΔS(T) curves for the tested sample indicates that the shape of the −ΔS(T) curve changes with increasing pressure.

Figure 11:
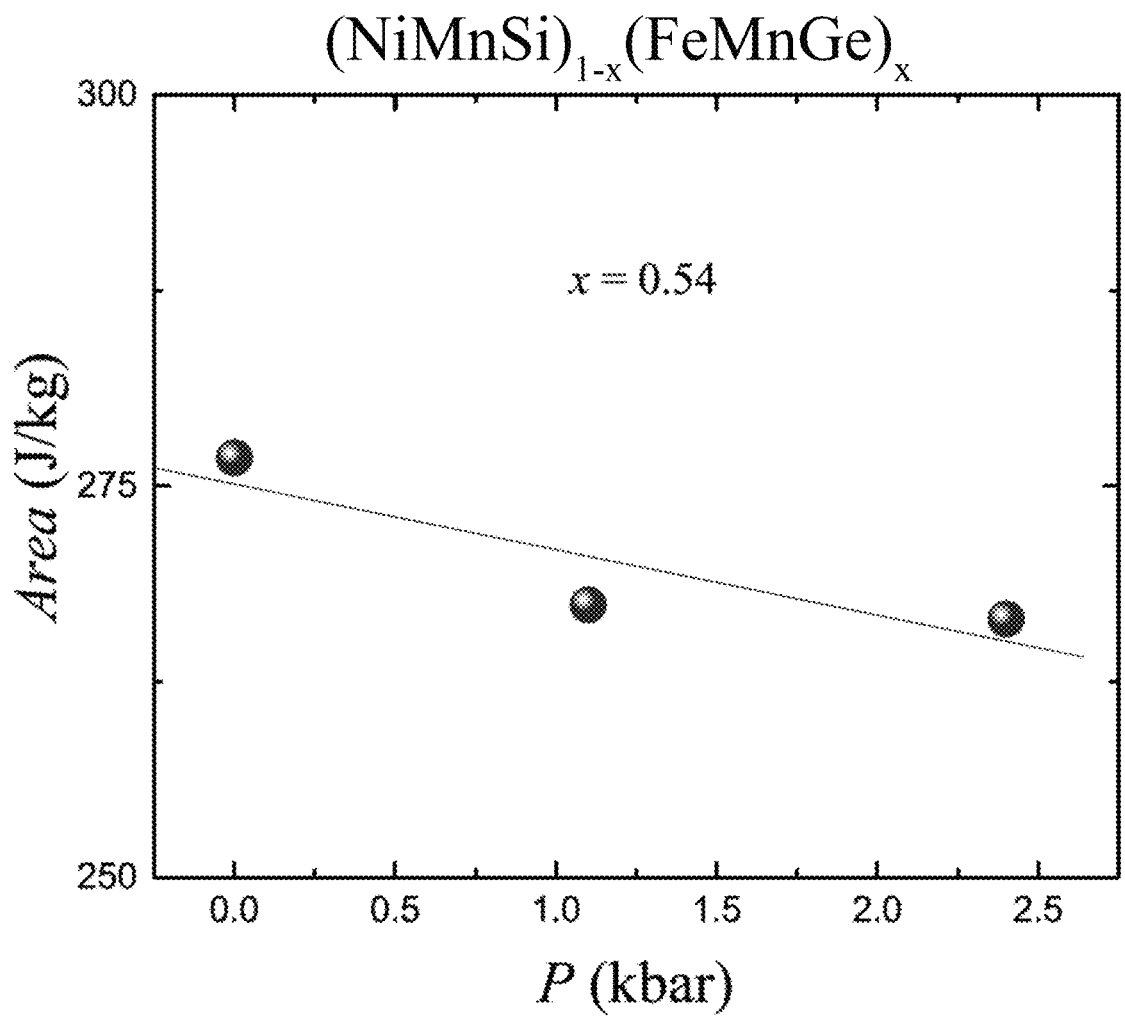
FIG. 11 conceptually illustrates refrigeration capacity for $(MnNiSi)_{1-x}(FeMnGe)_x$ as composition dependent total integrals showing area under entropy change $(-\Delta S(T))$ curves at ambient pressure, and as a function of applied hydrostatic pressure (for x=0.54)

FIG. 11 conceptually illustrates refrigeration capacity for $(MnNiSi)_{1-x}(FeMnGe)_x$ as composition dependent total integrals showing area under entropy change (−ΔS(T)) curves at ambient pressure, and as a function of applied hydrostatic pressure (for x=0.54). Interestingly, the total area under the S(T) curve remains nearly constant with application of pressure, as shown in FIG. 11. This type of area conservation is in accordance with the maximum limit of the refrigerating power:

$$\int_0^\infty \Delta S \, dT = -M_S \cdot \Delta B$$

$M_s$ is the saturation magnetization, which is expected to be constant provided $M_s$ remains unchanged [M~110 emu/g at T=10 K for B=5 T] at ambient pressure, as well as under the condition of applied pressure for x=0.54. Therefore, the decrease in the width of the −S(T) curve is compensated by an increase in its maximum value as the pressure increases.

Figure 12:
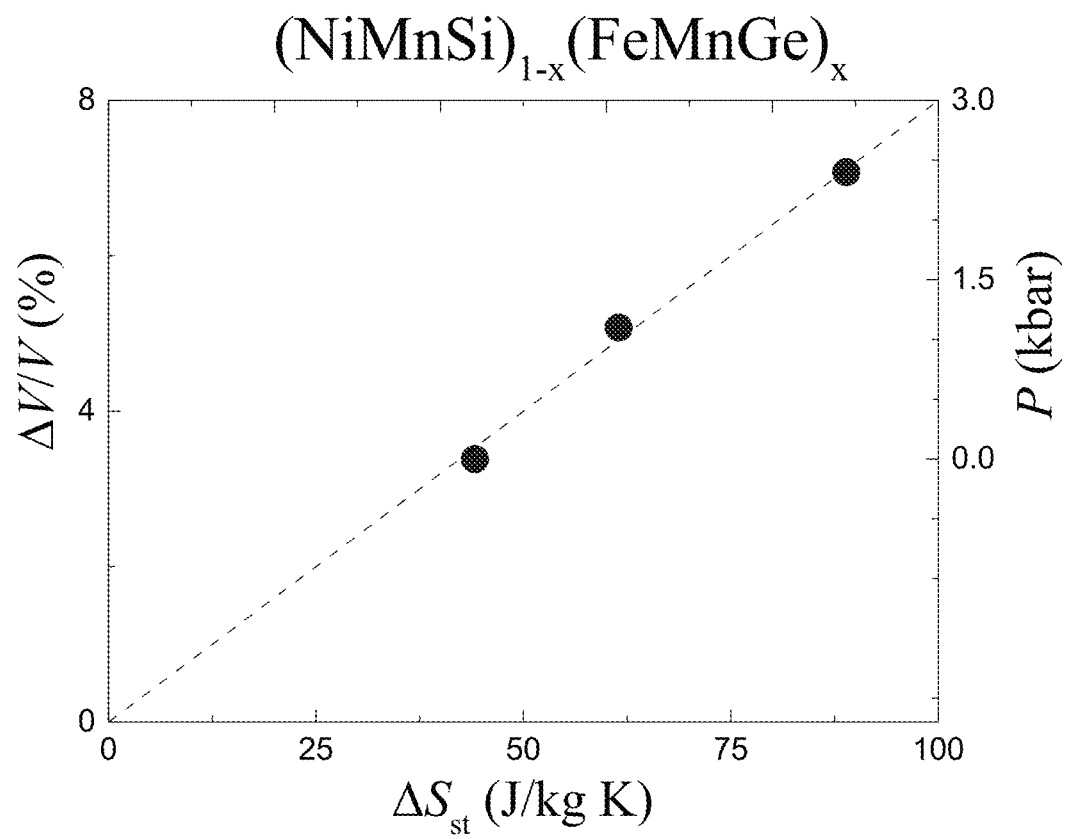
FIG. 12 conceptually illustrates dependence of relative volume changes $(\Delta V/V)$ with structural entropy changes $(\Delta S_{st})$, and pressure-induced modification of $\Delta S_{tot}$ for $(MnNiSi)_{1-x}(FeMnGe)_x$ (x=0.54), with $\Delta S_{tot} \sim \Delta S_{st}$, since $\Delta S_{st} \gg \Delta S_M$.

FIG. 12 conceptually illustrates dependence of relative volume changes (ΔV/V) with structural entropy changes ($\Delta S_{st}$), and pressure-induced modification of $\Delta S_{tot}$ for (MnNiSi)$_{1-x}$(FeMnGe)$_x$ (x=0.54), with $\Delta S_{tot}$~$\Delta S_{st}$, since $\Delta S_{st}$>>$\Delta S_M$. The observed pressure-induced, twofold increase of |ΔS| from 44 to 89 J/kgK is associated with a large volume change during the MST from a FM orthorhombic to a PM hexagonal phase. As graphically illustrated in FIG. 12, the application of 2.4 kbar of pressure induces a relative volume change of ΔV/V~7% in the sample, and results in an enormous increase in ΔS.

Hydrostatic pressure acts as a parameter that leads to a giant enhancement of the magnetocaloric effect in (MnNiSi)$_{1-x}$(MnFeGe)$_x$, and is associated with an extreme volume change (~7%) in the vicinity of the MST. The pressure-induced volume change during the MST significantly enhances the structural entropy change, and results in a giant enhancement of the total isothermal entropy change by about twofold, from 44 J/kgK at ambient pressure to 89 J/kgK at P=2.4 kbar. The pressure-enhanced magnetocaloric effects are accompanied by a shift in transition temperature, an effect that may be exploited to tune the transition to the required working temperature, and thereby eliminate the need for a given material to possess a large MCE over a wide temperature range.

FIG. 13 illustrates composition dependent temperature dependency of magnetization in the presence of a 0.1 T magnetic field during heating and cooling for (MnNiSi)$_{1-x}$(CoFeGe)$_x$, as measured at various pressures. The structural entropy change (−ΔSst) associated with volume change ΔV was estimated (for x=0.40) by employing the Clausius-Clapeyron equation. The relative volume change (2.85%) was determined from temperature dependent XRD measurements made just above and below the MST. The corresponding structural entropy change is −ΔSst=38.7 J/kg K.

Figure 14:
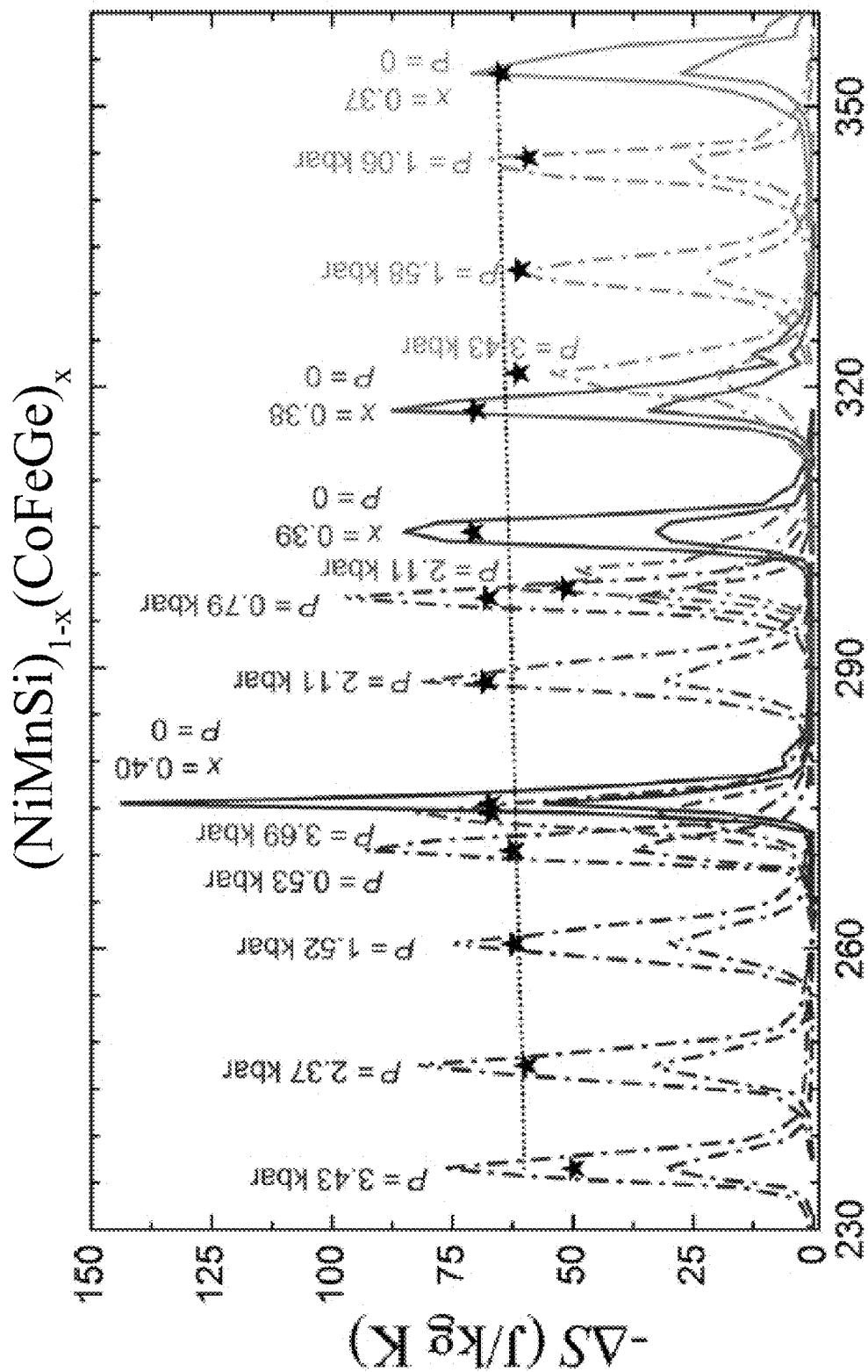
FIG. 14 provides plots of composition dependent isothermal entropy changes $(-\Delta S)$ for $(MnNiSi)_{1-x}(CoFeGe)_x$ as a function of temperature at ambient and different applied hydrostatic pressures, with the "star" symbols inside each $-\Delta S(T)$ curve representing the corresponding total entropy change estimated employing the Clausius-Clapeyron equation for $\Delta B=5$ T, and a linear fit of these values indicated by a black dotted line.

FIG. 14 provides plots of composition dependent isothermal entropy changes (−ΔS) for (MnNiSi)$_{1-x}$(CoFeGe)$_x$ as a function of temperature at ambient and different applied hydrostatic pressures, with the "star" symbols inside each −ΔS(T) curve representing the corresponding total entropy change estimated employing the Clausius-Clapeyron equation for ΔB=5 T, and a linear fit of these values indicated by a dotted line. With the application of hydrostatic pressure, peaks in the −ΔS(T) curves shift to lower temperatures at a rate (sensitivity) of about $dT_M/dP$~−10 K/kbar, but the MCE remains robust over the temperature ranges shown.

Figure 15:
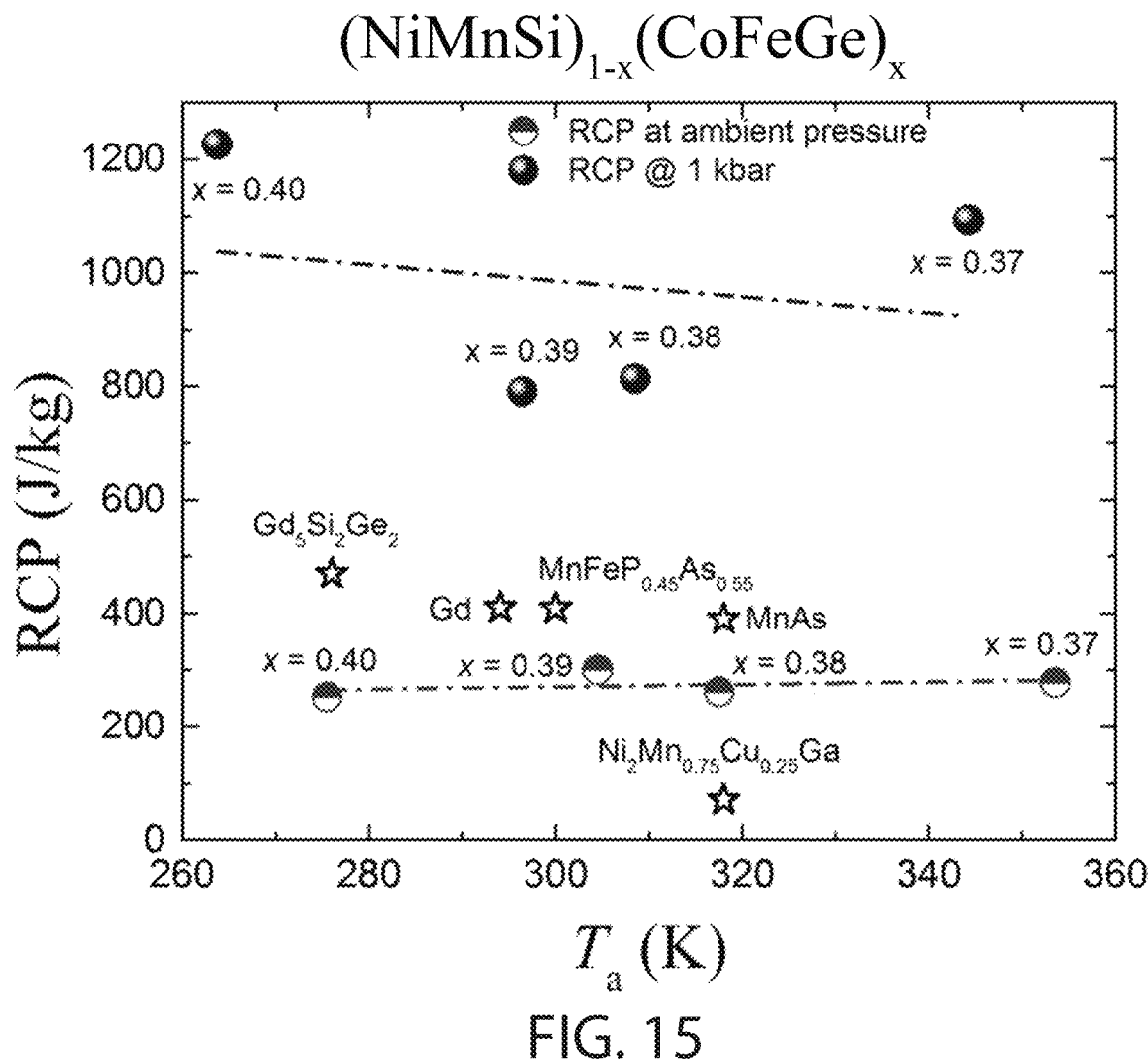
FIG. 15 shows relative cooling power (RCP) as a function of temperature at ambient pressure for $(MnNiSi)_{1-x}(CoFeGe)_x$ in comparison to other known magnetic refrigerant materials, with $T_a$ being the temperature corresponding to $-\Delta S_{max}$ for a field change of 5 T, illustrating a remarkable enhancement in the effective RCP with the application of 1 kbar pressure, and providing a linear fit of the composition-dependent values of the RCP.

FIG. 15 shows relative cooling power (RCP) as a function of temperature at ambient pressure for (MnNiSi)$_{1-x}$(CoFeGe)$_x$ in comparison to other known magnetic refrigerant materials, with $T_a$ being the temperature corresponding to −ΔSmax for a field change of 5 T, illustrating a remarkable enhancement in the effective RCP with the application of 1 kbar pressure, and providing a linear fit of the composition-dependent values of the RCP. The relative cooling power (RCP=|−ΔSmaxx×$\delta T_{FWHM}$|, where $\delta T_{FWHM}$ is the full-width at half-maximum of the −ΔS vs. T plot) of (MnNiSi)$_{1-x}$(FeCoGe)$_x$ at ambient pressure varies only moderately with composition, and the material suffers very low magnetic hysteresis losses, as shown in FIG. 6. Although (MnNiSi)-Δ(FeCoGe)$_x$ exhibits a very large entropy change, more than an order of magnitude larger than that of Gd metal, the narrow width of its −ΔS(T) curve compromises its applicability for magnetic cooling. In principle, the effective range of the working temperature could be extended by introducing a compositional variation in the material (i.e., gradient materials or composites). However, a more sophisticated strategy would be to take advantage of the sensitivity of the transition temperature to applied hydrostatic pressure (~10 K/kbar).

Figure 16:
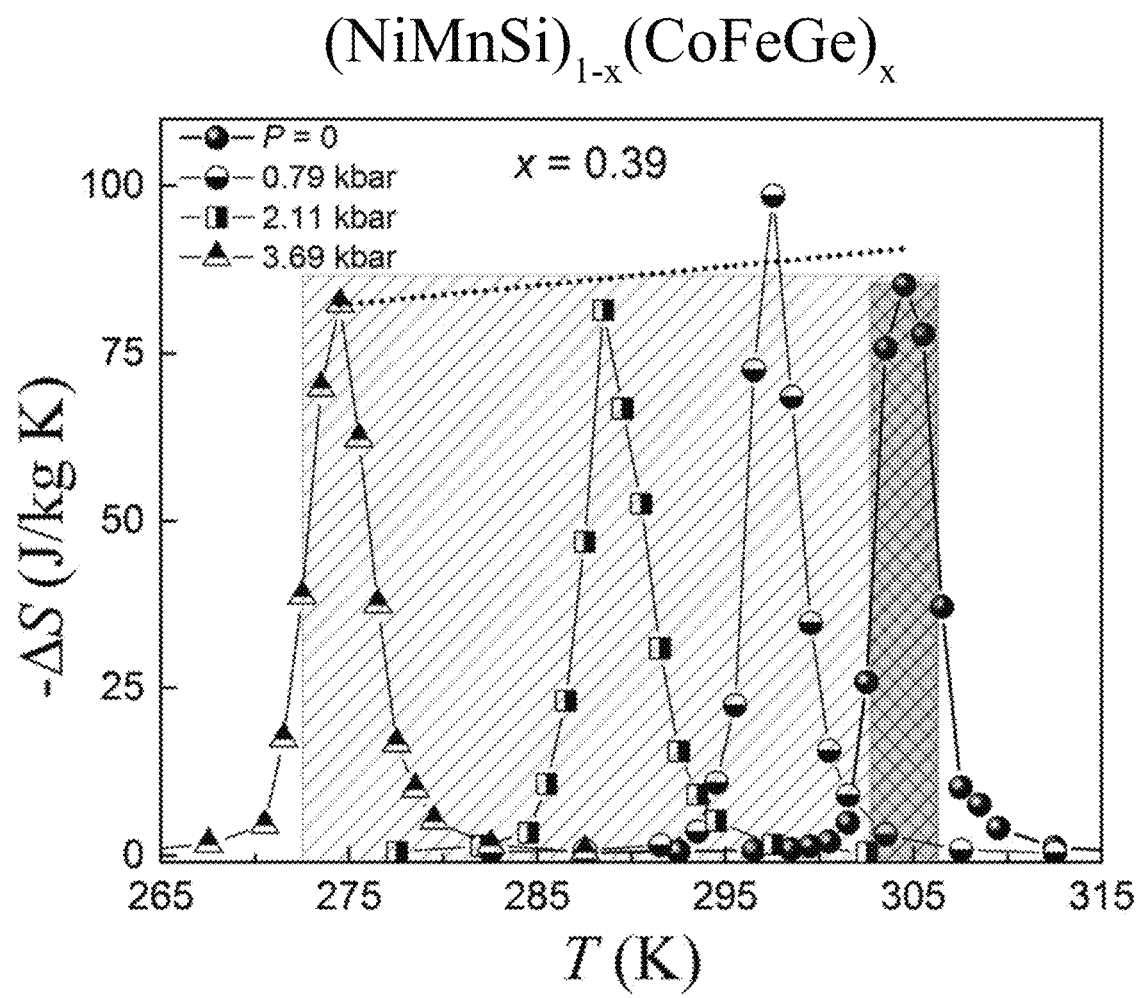
FIG. 16 shows pressure-induced enhancement of the effective RCP for $(MnNiSi)_{1-x}(CoFeGe)_x$ for x=0.39, with a linear fitting of $-\Delta S_{max}$ at ambient pressure and at different applied pressures, from which the value of $-\Delta S_{max}$ is determined at the midpoint between the $-\Delta S(T)$ peaks at ambient pressure and the highest applied pressure.

FIG. 16 shows pressure-induced enhancement of the effective RCP for (MnNiSi)$_{1-x}$(CoFeGe)$_x$ for x=0.39, with a linear fitting of −ΔSmax at ambient pressure and at different applied pressures, from which the value of −ΔSmax is determined at the midpoint between the −ΔS(T) peaks at ambient pressure and the highest applied pressure. Since a large MCE is maintained as the MST shifts in temperature, a radical improvement of the "effective RCP" of the material could be utilized. Where the "effective RCP" of a material undergoing a first-order magnetic phase transition can be improved by applying hydrostatic pressure while simultaneously varying the applied magnetic field, the effective width of −ΔS(T) should increase by an amount equal to the temperature shift with pressure. In the case of (MnNiSi)$_{1-x}$(FeCoGe)$_x$ with x=0.40, applying 1 kbar of pressure along with a field change of ΔB=5 T, increases the effective RCP by a factor of five. In addition, the working temperature range increases to $\delta T_{FWHM}$=10 K. FIG. 16 shows the enhancement of the effective RCP by up to factor of fifteen of the compound with x=0.39 under applied pressures up to 3.69 kbar together with the magnetic field 5 T. The effective temperature range spans room temperature through the freezing point of water, which may be ideal for certain cooling applications.

Figure 17:
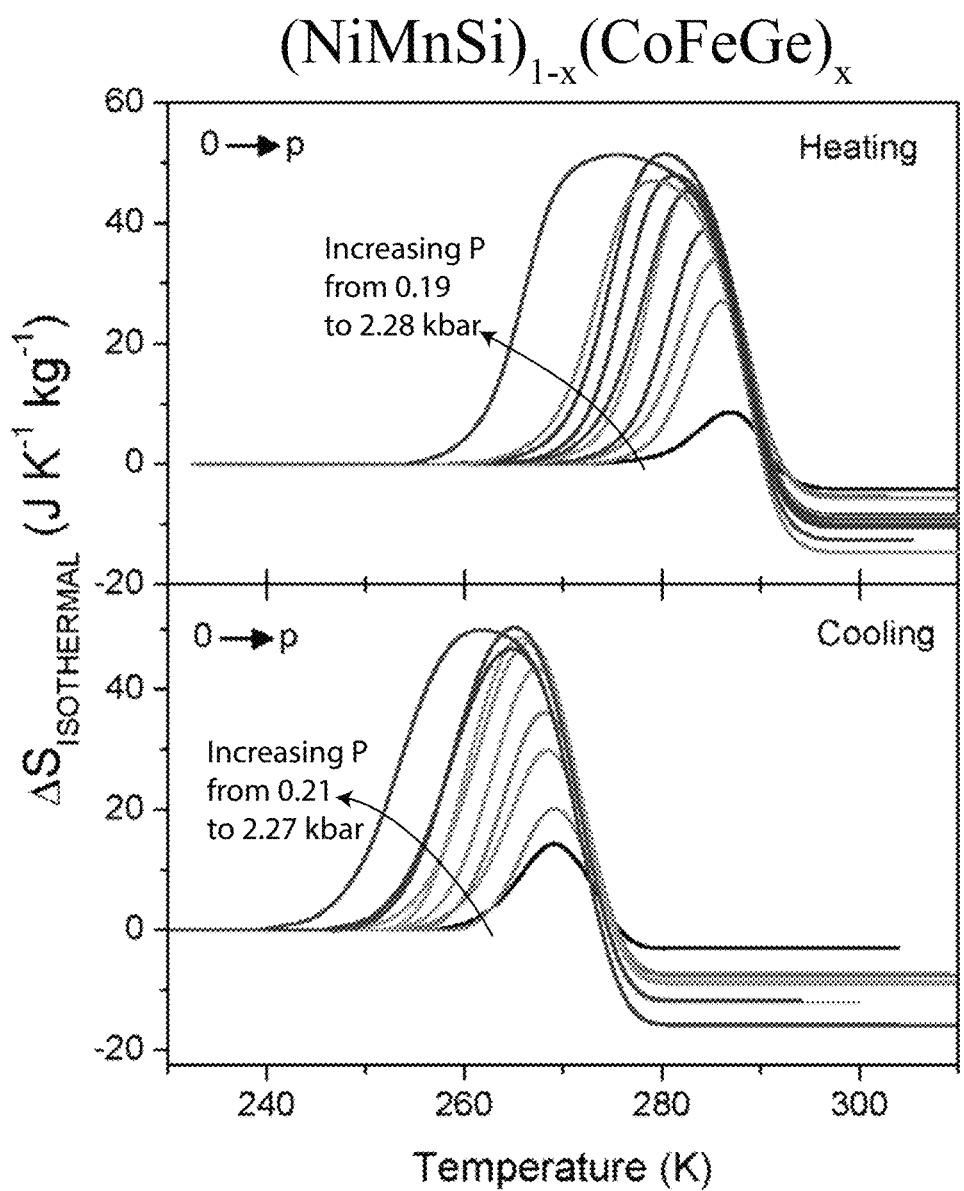
FIG. 17 illustrates barocaloric effects for $(MnNiSi)_{1-x}(CoFeGe)_x$ (x=0.40) with isothermal entropy changes at increasing pressures, for both heating and cooling, showing high maximum values, a width of about 25 to 30 K, and tunability (with pressure and composition) over a wide range of temperatures, including 240 to 360 K.
Figure 18:
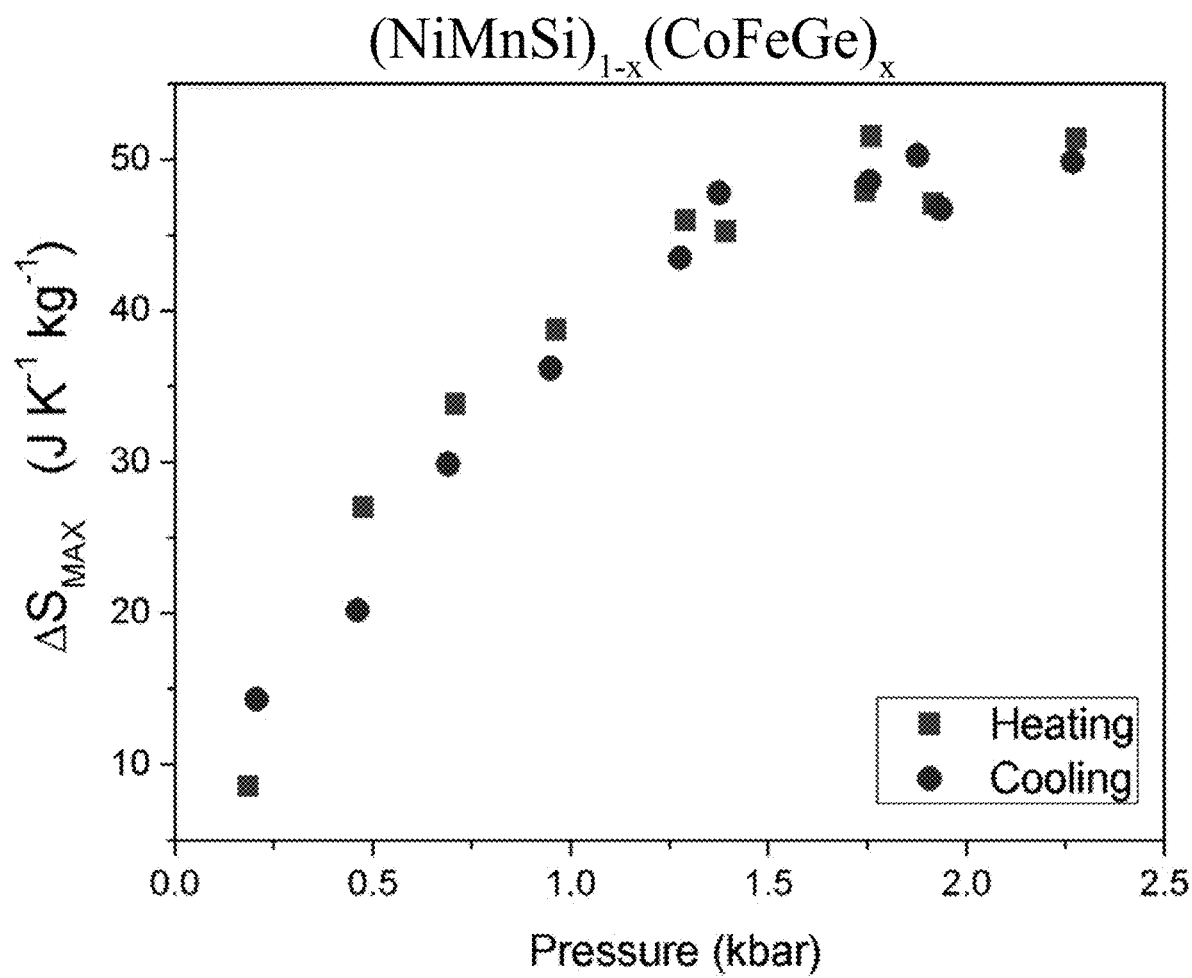
FIG. 18 illustrates maximum barocaloric effects for $(MnNiSi)_{1-x}(CoFeGe)_x$ (x=0.40) with maximum isothermal entropy changes at increasing pressures for both heating and cooling.

FIG. 17 illustrates barocaloric effects for (MnNiSi)$_{1-x}$(CoFeGe)$_x$ (x=0.40) with isothermal entropy changes at increasing pressures, for both heating and cooling, showing high maximum values, a width of about 25 to 30 K, depending upon composition variation. The material exhibits acute sensitivity to pressure, as clearly shown by FIG. 18, which illustrates maximum barocaloric effects for (MnNiSi)$_{1-x}$(CoFeGe)$_x$ with maximum isothermal entropy changes at increasing pressures for both heating and cooling. Isothermal entropy −$\Delta S_{max}$ changes from roughly about 10 to 15 J/(K kg) to about 50 J/(K kg), as pressure increases from roughly about 0.25 kbar to roughly about 2.25 kbar.

In sum, by combining two isostructural compounds (A and B, as described above), within certain ranges of proportions or concentrations, each compound having extremely different magnetic and thermo-structural properties, a new system that possesses extraordinary magnetocaloric and barocaloric properties with an acute sensitivity to applied pressure is provided. The MnNiSi-based systems according to principles of the invention constitute a new class of room temperature magnetocaloric and barocaloric materials that exhibits extraordinarily large multicaloric effects and fit many of the criteria for an ideal magnetocaloric or barocaloric material including: (i) suffering no appreciable magnetic hysteresis losses; (ii) being composed of nontoxic, abundant materials; and (iii) having a straightforward and repeatable synthesis processes. A characteristic that makes these new materials extremely promising, however, is their response to applied hydrostatic pressure, which provides a means to optimize or tune the magnetocaloric and barocaloric effects at any temperature within its active range.

Figure 19:
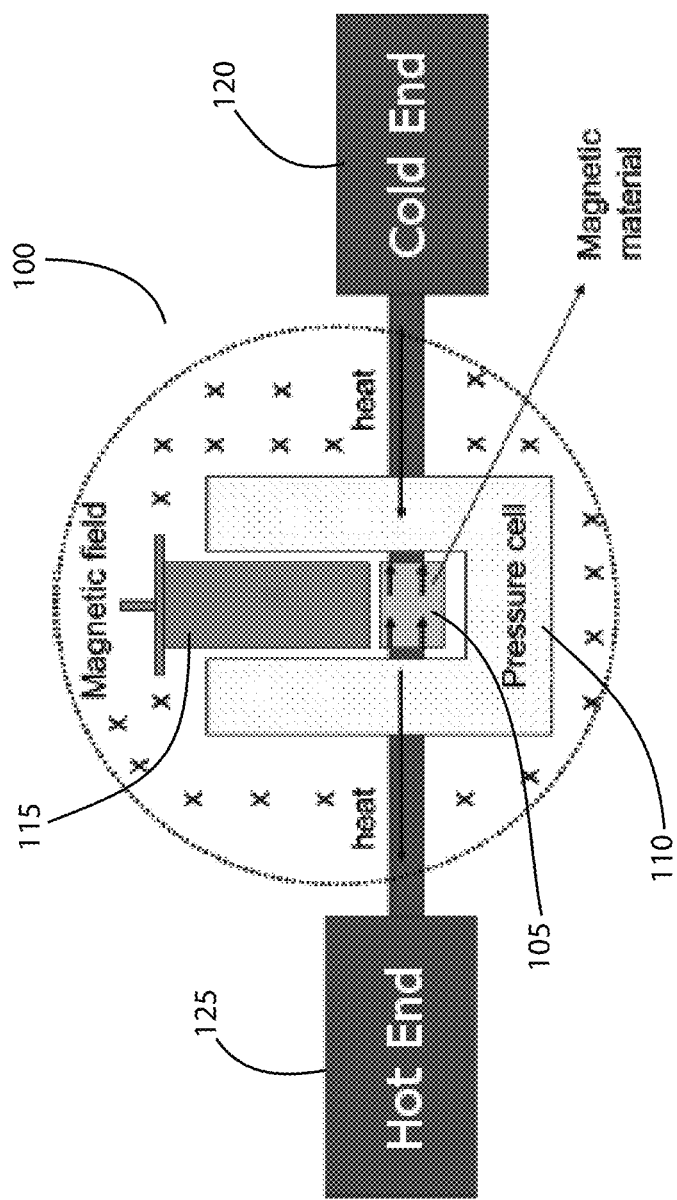
FIG. 19 provides a high level schematic of an exemplary device in which a composition of matter according to principles of the invention may be used to provide heating and/or cooling via magnetocaloric effect, barocaloric effect, or multicaloric effect.

An alloy according to principles of the invention may be used in a system that applies hydrostatic pressure and/or a magnetic field to achieve heat transfer to and from a working fluid. One example of such a system 100 is a pressurized magnetocaloric heat pump schematically illustrated in FIG. 19. The working material 105 is comprised of an MnNiSi-based alloy according to principles of the invention. A pressure cell 110 contains and pressurizes a fluid that exerts and maintains hydrostatic pressure on the contained working material. A magnetic field source 115 (e.g., permanent or electromagnet) is provided in close proximity to the material 105. The induced magnetic field must be controllable, by either moving the source 115 relative to the material 105, or moving the material 105 relative to the source 115, or electrically controlling the magnetic field in the case of an electromagnet. The working material 105 heats up when the magnetic field is applied and cools down when the magnetic field is released. When the working material 105 is heated, heat is transferred from the working material 105 to a flowing fluid in thermal communication with a heat exchanger on the hot side 125 of the unit. When the working material 105 cools, heat is transferred to the working material 105 from a flowing fluid in thermal communication with a heat exchanger on the cold side 125 of the unit. Thus, fluids flowing through cold 120 and hot side 125 heat exchangers provide sources for cooling or heating.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. An alloy consisting of:
a first compound, said first compound comprising $Mn_{1\pm\alpha}Ni_{1\pm\beta}Si_{1\pm\gamma}$, wherein $\alpha \leq 0.25$, $\gamma \leq 0.25$, and $\gamma \leq 0.25$;
a second compound, said second compound isostructurally substituting the first compound, and said second compound comprising one of $Fe_{1\pm\lambda}Mn_{1\pm\mu}Ge_{1\pm v}$ wherein $\lambda \leq 0.25$, $\mu \leq 0.25$, and $v \leq 0.25$ and $Co_{1\pm\lambda}Fe_{1\pm\mu}Ge_{1\pm v}$ wherein $\lambda \leq 0.25$, $\mu \leq 0.25$, and $v \leq 0.25$;
where the ratio of the first compound to the second compound is 1-x to x; and
where when the second compound comprises $Co_{1\pm\lambda}Fe_{1\pm\mu}Ge_{1\pm v}$ then x is from 0.30 to 0.50, and when the second compound is $Fe_{1\pm\lambda}Mn_{1\pm\mu}Ge_{1\pm v}$ then x is from 0.40 to 0.65.

2. An alloy consisting of:
a first compound, said first compound comprising $Mn_{1\pm\alpha}Ni_{1\pm\beta}Si_{1\pm\gamma}$, wherein $\alpha \leq 0.25$, $\beta \leq 0.25$, and $\gamma \leq 0.25$;
a second compound, said second compound isostructurally substituting the first compound, and said second compound comprising one of $Fe_{1\pm\lambda}Mn_{1\pm\mu}Ge_{1\pm v}$ wherein $\lambda \leq 0.25$, $\mu \leq 0.25$, and $v \leq 0.25$ and $Co_{1\pm\lambda}Fe_{1\pm\mu}Ge_{1\pm v}$ wherein $\lambda \leq 0.25$, $\mu \leq 0.25$, and $v \leq 0.25$;
where the ratio of the first compound to the second compound is 1-x to x; and
where when the second compound comprises $Co_{1\pm\lambda}Fe_{1\pm\mu}Ge_{1\pm v}$ then x is from 0.30 to 0.50, and when the second compound is $Fe_{1\pm\lambda}Mn_{1\pm\mu}Ge_{1\pm v}$ then x is from 0.40 to 0.65 and further comprising an element from the group consisting of B, C, N, P, S, As and H, the element from the group consisting of B, C, N, P, S, As and H comprising not more than 15% by mass of the alloy.

3. An alloy consisting of
a first compound, said first compound comprising $Mn_{1\pm\alpha}Ni_{1\pm\beta}Si_{1\pm\gamma}$, wherein $\alpha \leq 0.25$, $\beta \leq 0.25$, and $\gamma \leq 0.25$; and
a second compound, said second compound isostructurally substituting the first compound, and said second compound comprising $Fe_{1\pm\lambda}Mn_{1\pm\mu}Ge_{1\pm v}$, wherein $\lambda \leq 0.25$, $\mu \leq 0.25$, and $v \leq 0.25$.

4. An alloy consisting of
a first compound, said first compound comprising $Mn_{1\pm\alpha}Ni_{1\pm\beta}Si_{1\pm\gamma}$, wherein $\alpha \leq 0.25$, $\beta \leq 0.25$, and $\gamma \leq 0.25$; and
a second compound, said second compound isostructurally substituting the first compound, and said second compound comprising $Fe_{1\pm\lambda}Mn_{1\pm\mu}Ge_{1\pm v}$, wherein $\lambda \leq 0.25$, $\mu \leq 0.25$, and $v \leq 0.25$ and further comprising an element from the group consisting of B, C, N, P, S, As and H, the element from the group consisting of B, C, N, P, S, As and H comprising not more than 15% by mass of the alloy.

5. An alloy consisting of
a first compound, said first compound comprising $Mn_{1\pm\alpha}Ni_{1\pm\beta}Si_{1\pm\gamma}$, wherein $\alpha \leq 0.25$, $\beta \leq 0.25$, and $\gamma \leq 0.25$; and
a second compound, said second compound isostructurally substituting the first compound, and said second compound comprising $Co_{1\pm\lambda}Fe_{1\pm\mu}Ge_{1\pm v}$ wherein $\lambda \leq 0.25$, $\mu \leq 0.25$, and $v \leq 0.25$.

6. An alloy consisting of
a first compound, said first compound comprising $Mn_{1\pm\alpha}Ni_{1\pm\beta}Si_{1\pm\gamma}$, wherein $\alpha \leq 0.25$, $\beta \leq 0.25$, and $\gamma \leq 0.25$; and
a second compound, said second compound isostructurally substituting the first compound, and said second compound comprising $Co_{1\pm\alpha}Fe_{1\pm\mu}Ge_{1\pm v}$ wherein $\lambda \leq 0.25$, $\mu \leq 0.25$, and $v \leq 0.25$ and further comprising an element from the group consisting of B, C, N, P, S, As and H, the element from the group consisting of B, C, N, P, S, As and H comprising not more than 15% by mass of the alloy.

* * * * *